United States Patent
Vogelsanger et al.

(10) Patent No.: US 10,125,057 B2
(45) Date of Patent: Nov. 13, 2018

(54) USE OF A SOLID FOR THE PRODUCTION OF A PROPELLANT POWDER

(75) Inventors: Beat Vogelsanger, Thun (CH); Bruno Ossola, Faulensee (CH); Alexander Huber, Grosskarolinenfeld (DE); Christian Wagner, München (DE); Oliver Hampel, Waldkraiburg (DE)

(73) Assignee: NITROCHEMIE ASCHAU GMBH, Aschau Am Inn (DE)

( * ) Notice: Subject to any disclaimer, the term of this patent is extended or adjusted under 35 U.S.C. 154(b) by 402 days.

(21) Appl. No.: 14/128,443

(22) PCT Filed: Mar. 28, 2012

(86) PCT No.: PCT/CH2012/000069
§ 371 (c)(1),
(2), (4) Date: Jul. 1, 2014

(87) PCT Pub. No.: WO2012/174669
PCT Pub. Date: Dec. 27, 2012

(65) Prior Publication Data
US 2014/0326370 A1 Nov. 6, 2014

(30) Foreign Application Priority Data
Jun. 21, 2011 (CH) .................... 1047/11

(51) Int. Cl.
*C06B 45/04* (2006.01)
*C06B 21/00* (2006.01)
(Continued)

(52) U.S. Cl.
CPC ........... *C06B 45/04* (2013.01); *B29B 13/021* (2013.01); *C06B 21/0083* (2013.01); *C06B 45/00* (2013.01); *C06B 45/22* (2013.01)

(58) Field of Classification Search
CPC ..................................... C06B 45/04
See application file for complete search history.

(56) References Cited

U.S. PATENT DOCUMENTS 3,506,505 A 4/1970 Hermann et al.
7,051,658 B2 * 5/2006 Fahrni ................ C06B 21/0083
102/292

(Continued)

FOREIGN PATENT DOCUMENTS

DE 25 20 882 C1 7/1986
EP 0 290 718 A1 11/1988
(Continued)

OTHER PUBLICATIONS

Kyoritsu Shuppan Co., Ltd., "Handbook of Industrial Explosives," Edited by the Industrial Explosives Society Japan, Dec. 10, 1983, pp. 156-157.

*Primary Examiner* — Aileen B Felton
(74) *Attorney, Agent, or Firm* — Birch, Stewart, Kolasch & Birch, LLP

(57) ABSTRACT

For production of a propellant charge powder, especially for medium and large calibers, in a process in which the solid is incorporated together with a liquid in a mixing and drying process into the channels of a granular green material and compacted therein to form a plug, the solid, under otherwise identical process conditions, is set within a setting range of >0-0.5% by weight based on the weight of the granular green material. For more significant lowering of the maximum pressure within an upper temperature range and for more significant raising of the maximum pressure within a lower temperature range of the application temperature range, an increased amount of solid is used. The solid is a substance whose melting point is at least 10° C., especially 20° C., above a maximum use temperature of the propellant charge powder and which is inert toward the granular green (Continued)

material. Since the plug consists virtually exclusively of inert material, a high ballistic stability is achieved.

19 Claims, 6 Drawing Sheets

(51) Int. Cl.
    *C06B 45/00*     (2006.01)
    *C06B 45/22*     (2006.01)
    *B29B 13/02*     (2006.01)

(56) References Cited

U.S. PATENT DOCUMENTS

2002/0134269 A1     9/2002     Fahrni et al.
2003/0129304 A1     7/2003     Jeck-Prosch et al.

FOREIGN PATENT DOCUMENTS

| EP | 1 031 548 A1 | 8/2000 |
| EP | 1 241 151 A1 | 9/2002 |
| EP | 1 241 152 A1 | 9/2002 |
| FR | 1.205.433 | 2/1960 |
| FR | 1.300.941 | 7/1962 |
| JP | 2007-85632 A | 4/2007 |
| JP | 2010-132537 A | 6/2010 |

\* cited by examiner

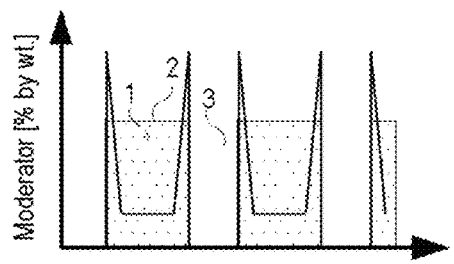
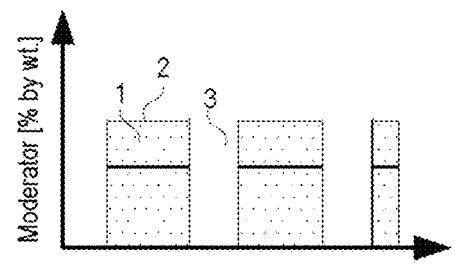
Fig. 9a                    Fig. 9b
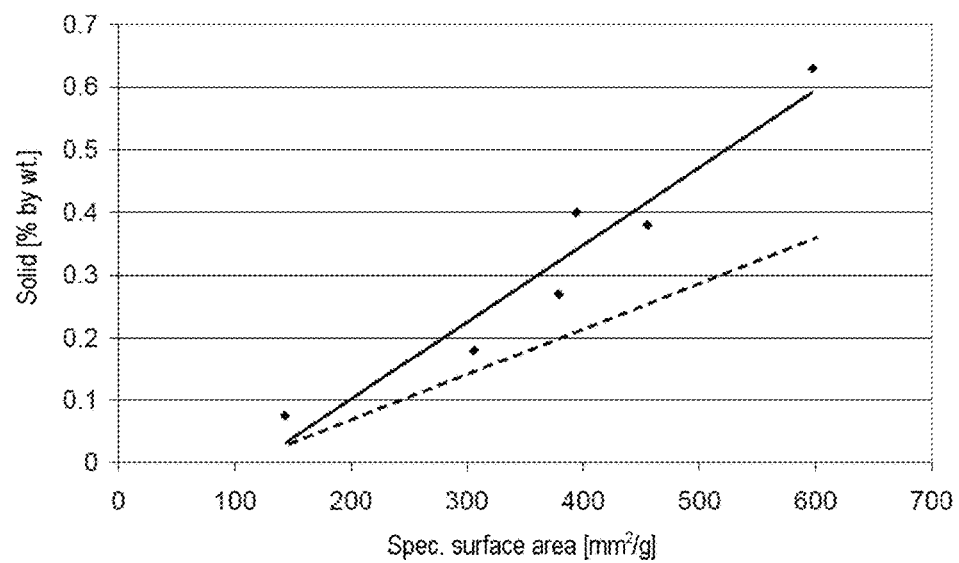
Fig. 4

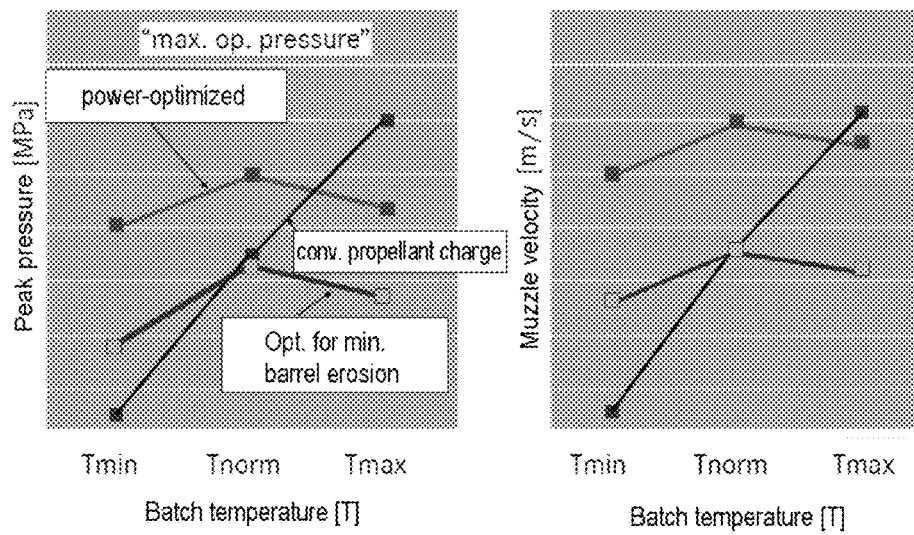
Fig. 10a  Fig. 10b
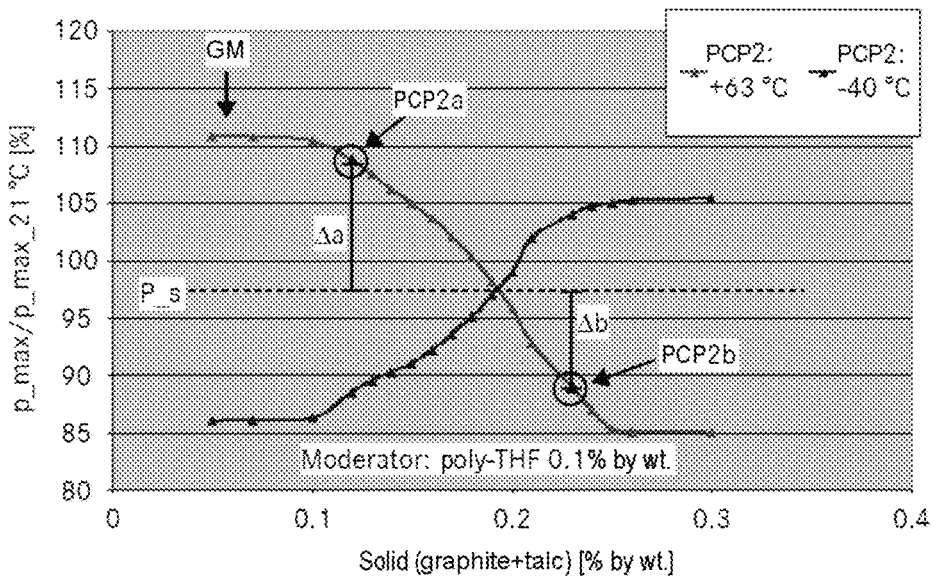
Fig. 11

US 10,125,057 B2

USE OF A SOLID FOR THE PRODUCTION OF A PROPELLANT POWDER

TECHNICAL FIELD

The invention relates to the use of a solid for production of a propellant charge powder, especially for medium and large calibers, in a process in which the solid is incorporated together with a liquid in a mixing and drying process into the channels of a granular green material and compacted therein to form a plug, the solid being a substance whose melting point is at least 10° C., especially 20° C., above a maximum use temperature of the propellant charge powder and which is inert toward the granular green material. The invention further relates to a process for producing a propellant charge powder and to a propellant charge powder obtainable by this process.

STATE OF THE ART

It is a known problem that propellant charge powders exhibit different burnoff characteristics according to the application temperature. The result of a marked temperature dependence is that the power cannot be optimally exhausted with an existing weapon system. There was therefore a need to reduce the temperature dependence of a propellant charge powder in a controlled manner, in order to achieve better powers with existing weapon systems (internal ballistic power enhancement).

EP 0 290 718 A1 (Rheinmetall) mentions that, in the case of graphitization of the granular green material, there may be inexplicable and irreproducible changes or improvements in the thermal characteristics. This was ascribed to the penetration of graphite into the holes of the multipole powder and to the formation of occlusions. Since random instances of improvement, however, are virtually unutilizable, EP 0 290 718 A1 proposed closing the orifices of the channels by squeezing the cross section, in order that no graphite can penetrate in.

One way of controlling the thermal characteristics through the choice of granular geometry is known from DE 25 20 882 C1 (Dynamit Nobel). It is proposed that the holes, in the case of a 19×0.13 mm multihole powder with external diameter 3.5 mm, be formed with different sizes, some of the holes being below a critical value for the flame spread. This granular green material is then subjected to a surface treatment by first spraying it with 1% by weight of alcohol in a drum and then treating it with 1% of a phthalate in 10% alcoholic solution. At the end, 0.1% by weight of graphite is added for polishing. In another working example, the extruded granular green material is treated with 0.03% by weight of graphite, in order to increase the conductivity of the freshly extruded granular green material, and to avoid the conglutination of the individual granules during the drying.

DE 25 20 882 C1 refers to a further concept for control of the thermal characteristics, namely to the encapsulation of the surface of the powder granule through phlegmatizers. FR 1 300 941 (État Français) discloses, for example, coating the surface with a phlegmatizer and simultaneously keeping the channels clear through suitable selection of internal diameter of the channels, temperature during the treatment, and viscosity of the substances used. This approach is disadvantageous because of the high amount of phlegmatizing treatment compositions (2-5%) and the ignition delay, and has inadequate reliability and reproducibility.

The process according to U.S. Pat. No. 3,506,505 (Dynamit Nobel) proceeds from a surface coating operation with a plasticizer (centralite I) for stabilization of the powder and for influencing progressive burnoff. In order to be able to better control the ignition sensitivity of the NC-based propellant charge powder and to avoid formation of graphite lumps, specific metal oxides and metal sulfides are used as additives. In a preferred working example, in the surface treatment of a multihole powder, 4% camphor, 0.1% graphite and 1.0% titanium white are used in order to reduce the ignition delay by about 30 percent. There was no influence of the solids used on the thermal characteristics.

A further example of reduction in temperature dependence is known from FR 1 205 433 (Recherche Chimiques). An extruded multihole powder based on nitrocellulose (NC) is subjected to a surface treatment with a moderator and a nitric ester in solution. The moderator used is, for example, 2% by weight of centralite I or 3% by weight of camphor. In the two working examples, centralite I or camphor is dissolved in alcohol and applied with added graphite. Thereafter, the treated powder, in a known manner, is washed to remove the solvent and dried. Thus, a lower temperature coefficient is attained. The thermal characteristics are thus established with a particular amount of moderator.

A further process for reduction in the temperature dependence through use of suitable moderators or phlegmatizers is described in EP 1 031 548 A1 (Nitrochemie Aschau). Phlegmatizers having essentially zero migration are used. The surface is treated by spray application of a solution or emulsion of the phlegmatizer. Examples of substances to be employed include non-energetic polyesters, energetic polymers, alkylnitratoethylnitramines, dinitrodiazaalkanes, nitric esters, etc. According to example 3, a single-base 7-hole propellant charge powder with NC as energy carrier and centralite I as stabilizer is incubated in an emulsion of nitroglycerin in water in a rotating drum at 30° C. The microscopic studies showed that the internal holes are also filled partly or entirely by the phlegmatizer. This treatment was tested for 120 mm and 35 mm munitions. The burnoff characteristics are thus controlled by the moderator.

U.S. Pat. No. 7,051,658 (Nitrochemie Wimmis, Nitrochemie Aschau) discloses a multihole propellant charge powder (propellant charge powder for short) having temperature-independent burnoff characteristics because of plugs having temperature-dependent mobility. The plugs are produced by a surface treatment with a solid (in an amount of 0.085-0.4% by weight based on the still-untreated granular green material) and a moderator in an amount of 0.05-0.5% by weight. The propellant charge powder is intended for medium and large calibers and consists of grains having a diameter of at least 3 mm and having continuous channels or holes having an internal diameter of 0.02-0.5 mm.

Propellant charge powders of this kind have various advantages in practice. However, the production process is relatively difficult, and the optimization of the thermal characteristics of the propellant charge powder is associated with some complexity.

DESCRIPTION OF THE INVENTION

The problem addressed by the invention is that of providing a process which belongs to the technical field specified at the outset and which allows simpler adjustment of the thermal characteristics.

The solution to the problem is defined by the features of claims 1 and 2.

It has been recognized that the temperature dependence of a propellant charge powder can be adjusted via the choice of the amount of solid added. The solid used is a substance whose melting point is at least 10° C., especially 20° C., above a maximum use temperature of the propellant charge powder and which is inert toward the granular green material. In contrast to the known processes in which moderators are employed, the inventive adjustment of the thermal characteristics via the amount of solid can achieve long-term stability and reproducibility of the effect, in a way which has not been possible to date in practice. One reason for this is that the solid is inert, meaning that it does not change and does not move, since it cannot diffuse into the matrix of the propellant charge granules and also enters into barely any reactions with the substances of the matrix.

In the course of a mixing process, the solid is incorporated together with a liquid into the channels of a granular green material and compacted therein to form a plug. The powder granules of the granular green material are typically produced by extruding a paste-like material. In the course of extrusion, the powder granules are provided with one or more channels. The granule size is typically within the range of 3-15 mm (for medium- and large-caliber munitions). However, it is also possible to produce larger powder granules of diameter, for example, up to 20 mm. In the case of non-circular cross-sectional shapes (for example in the case of rectangular shapes), the diameter is replaced by a minimal cross-sectional dimension.

The solid, under otherwise identical process conditions, is set within a setting range of >0-0.5% by weight, a greater amount of solid being used for more significant lowering of the maximum pressure within the upper temperature range and for more significant raising of the maximum pressure within a lower temperature range of the application temperature range. ">0% by weight" in principle means any measurable amount. In practice, the lower limit will be at least 0.01% by weight.

It should be pointed out here that, in the description of the invention, the weight figures in percent (% by weight) are always based on the amount of the granular green material unless explicitly stated otherwise, or when the reference basis is not otherwise clearly apparent.

One finding on which the invention is based is the fact that there is a critical range of amounts of solid for the modification of the granular green material. If the amount of solid is varied within this critical range (which is referred to in the context of the invention as "setting range"), this results in a significant variation in the temperature gradient on application. Outside this setting range, there is virtually no dependence between amount of solid used and temperature gradient.

The setting range depends principally on the number of channels in the propellant charge powder. In the case of powders with 19-hole geometry, the setting range is broader than in the case of those with 7-hole geometry, since more solid is required for all the hole channels to be filled.

The setting range depends to a certain degree on the specific surface area of the propellant charge powder. In the case of medium calibers with 19-hole geometry (granule diameter 3.5-7 mm, specific surface area from 500 $mm^2/g$), the setting range has a breadth in the range of 0.25-0.5% by weight of solid. In the case of large calibers with 19-hole geometry (granule diameter from 7 mm, specific surface area up to 500 $mm^2/g$), the upper limit of the setting range is at a maximum of 0.25% by weight.

In the case of propellant charge powders having high specific surface area, it is not possible to make a clear separation of the setting range from the saturation of the surface area of the propellant charge powder. A broad transition range is established, in which the surface area is not yet saturated but some solid is already going into the channels.

The setting range should not be equated to the amount of solid used in a specific process. When the inventive plug production is combined with the conventional graphitization of the surface, the amount of graphite required, in terms of magnitude, is "above" the setting range. When the plug production is performed in a process (or process step) separate from the conventional surface treatment, the surface is, for example, already saturated with solid, and it is merely necessary to provide that portion of solid which is required for the plug production itself. In this case, the amount used in the separate plug production process is within the inventive setting range, since no "base amount" of solid has to be provided for the customary surface coating.

One aspect of the invention thus consists in a novel use of a solid for production of a propellant charge powder, especially for medium and large calibers, in a process in which the solid is incorporated together with a liquid in a mixing and drying process into the channels of a granular green material and compacted therein to form a plug. The solid is a substance whose melting point is at least 10° C., especially 20° C., above a maximum use temperature or application temperature of the propellant charge powder and which is inert toward the granular green material. Under otherwise identical process conditions, the solid is set within a setting range of >0-0.5% by weight based on the weight of the granular green material. The setting in the context of the inventive use is effected by using a greater amount of solid for more significant lowering of the maximum pressure within an upper temperature range and for more significant raising of the maximum pressure within a lower temperature range of the application temperature range. In other words: in order to lower the maximum pressure within the upper temperature range (e.g. between 21° C. and the maximum application temperature), more solid is added in the process for production of the inventive plugs or hole channel occlusions. In order to target the maximum pressure within the lower temperature range, more solid is also added.

According to the invention, the process for producing a propellant charge powder having reduced temperature dependence within a given application temperature range has the following process steps a) to f):

a) A swellable granular green material having a given geometric configuration dimension and at least one continuous channel having a characteristic transverse dimension of not more than 0.3 mm and opening at an outer surface of the granular green material is provided.

The granular green material may consist, for example, of nitrocellulose (NC), cellulose acetate butyrate (CAB), polyglycidyl acid diol (GAP) or other gel-forming polymers or combinations of such substances. In quite general terms, single-, double- and triple-base granular green material is possible, although the number of energetic base substances is not crucial in the context of the present invention. What is important is that channels having an orifice or mouth which can be closed by solids are present. The number of channels has an influence on the controllability of the burnoff of the granular green material and should generally be at least two, preferably at least 7. The smaller the geometric dimensions of the granular green material, the smaller the number of channels will be in practice, and vice versa. If the number of channels is too small, the extent to which the form function can be influenced is too low, i.e. the burnoff can be influenced only insignificantly. The granular green material is typically produced by extruding a formable kneaded material, the holes (and the number thereof) being produced and defined through the configuration of the extruder die. The channels should not be too large; otherwise, they cannot be blocked by the inventive treatment. It has been found in tests that, in the case of circular cross-sectional forms, the channel diameter should not be greater than 0.3 mm, because the blocking operation otherwise does not proceed reliably. In the case of cross sections which are not round but oval or elliptical, the small diameter axis is important. Equally, in the case of a slot-shaped channel, the short and not the long axis is important. In this sense, every cross-sectional form has its own characteristic transverse dimension.

b) A solid which is stable within the application temperature range and is inert toward the granular green material and which has a particle size which allows the solid to be introduced into the continuous channels, and which can be compacted in the course of a mixing and drying process, is provided.

In the context of the invention, any granular substance can be used as the solid, provided that it does not diffuse into or react with the granule matrix defined by the granular green material over the course of time. In other words: the solid has to be inert with respect to the formulation of the granular green material. The application temperature range is a range defined by the application of the propellant charge powder. This extends typically from −40° C. to 80° C. Of course, the invention is not restricted to this temperature range. Even now, there are already MIL standards which envisage an application temperature range up to 90° C. In the individual case, the application temperature range may also be smaller (for example only extend up to 70° C. or 60° C. or only begin above −40° C.). Preferably, substances whose melting point is at least 10° C., especially 20° C., above the maximum use temperature are selected.

The particle size of the solid is smaller than the characteristic transverse dimension of the channels, such that the solid can penetrate into the channels in the course of the inventive treatment. In order that plugs can be formed from the solid in the channel openings, the pulverulent solid has to be compactable. This means that, under a particular pressure, the loose material can be converted to a desired shape and remains in this shape even when the external pressure is removed. A "particular pressure" is understood to mean the pressure which occurs during the inventive treatment in the mixing apparatus. It is defined by the mass in the mixing apparatus. If large masses or large amounts are used, the pressure which occurs (for example at the very bottom in the mixed material), or the pressure which is generated by the fall in amounts, is higher than in the case of small masses. If required, it is possible to determine in a simple pressing test what pressure is needed to achieve compaction of the inert pulverulent solid to a shaped body, and hence whether the solid tested is suitable.

The solid used does not sublime and its effect should not be confused with that of a moderator (even though moderators can form plugs).

c) A liquid which can swell the granular green material and which can either be completely removed or is present in homogeneous distribution in the propellant charge powder at the end of the production of the propellant charge powder is provided.

The effect of the liquid is that the sufficiently finely granular solid (as described in b), in the course of the inventive treatment, is transported into the channels and can be compacted therein under the applied pressure of the powder material. During the treatment, when the solid has been wetted by the liquid, local conglutination of the solid particles in the channel is promoted. The liquid may be a solvent (or a mixture of several solvents), or else a mixture of moderator and solvent. The solvent is completely removed (by vaporization and/or drying) after the inventive mixture treatment (or at the end of the mixture treatment; see also process step d). If some of the liquid is (deliberately) not removed (or cannot be removed because of its properties) at the end of the treatment, the remaining liquid should be distributed at least substantially homogeneously in the granular green material (or in the matrix of the propellant charge powder), in order that no change in the properties (owing to unwanted diffusion processes) can take place during the storage (typically for several years) of the propellant charge powder.

The moderator may be a low molecular weight substance which is either liquid or, when it is soluble in a low-viscosity liquid, solid.

The result of the swelling of the granular green material during the treatment and the subsequent removal or stabilization of the liquid is that the solid forms plugs with defined and (statistically) predictable thermal characteristics in the channels. In the swollen granular green material, the channels are slightly larger in cross section than after the treatment, when the swelling effect is over again. "Completely removed" is understood in the context of the invention to mean a mass which is sufficient to retain the thermal characteristics of the propellant charge powder established by the treatment over a required lifetime of several years.

Solvents of good suitability are low-viscosity liquids having high or low polarity. The boiling point of the liquid has to be higher than the surface treatment temperature. Nevertheless, the liquid should have a sufficiently high volatility that vaporization can take place at the treatment temperature within a short time (between 5 and 60 minutes). The liquid can also be removed with the aid of pressure reduction or by means of a warm gas stream. For the surface treatment, amounts of 0.1% to 5% liquid (based on the amount of the granular green material) are used. Preferably between 0.5% and 2% liquid is used. If the liquid contains a moderator, the moderator should be dissolved or finely emulsified in the solvent (which makes up the other portion of the liquid). The amount of liquid should generally be at a minimum, meaning that the granular green material should not float in the liquid.

The solvent used is matched to the formulation of the granular green material such that it can diffuse efficiently into the granular green material. However, it should not gelatinize the granular green material.

d) The liquid contains not more than 0.5% by weight (based on the granular green material) of an oligomeric or polymeric substance which serves as a moderator. Another portion of the liquid is essentially a low-viscosity solvent.

The moderator promotes the consolidation and conglutination of the solid during the treatment. It is incorporated into the channels of the granular green material together with the solid during the treatment in the mixing apparatus and ultimately diffuses into the matrix of the granular green material. The majority of the moderator will no longer be in the solid plugs in the channels after the drying, but will be distributed more or less homogeneously in the matrix of the granular green material. The moderator does not play any decisive role for the burnoff characteristics, since it is present only in a small amount. Unlike in the prior art, the moderator after the treatment and drying is not enriched in a near-surface layer or directly at the surface. The enrichment at the surface and the associated delay in burnoff is prevented by the use of small amounts of moderator and long drying times. Moreover, the upper limit of 0.5% by weight is selected because excessively large amounts of moderator are a disadvantage in the context of the invention, since they lead to a deterioration in the energy density.

It is also possible to dispense with the use of a moderator. In that case, the liquid is formed only by the low-viscosity solvent.

e) The granular green material is treated with the liquid and the solid in a mixing apparatus over a given duration.

In the mixing apparatus, stirring or agitation of the processing material takes place. The mass component which falls onto the rest of the mass from above in each case leads to a pressure of the powder mass in the mass beneath and thus brings about penetration of the solid-liquid mixture into the channels of the granular green material, and compaction and consolidation of the solid present in the channels. The treatment time depends in the individual case on the geometry of the granular green material and on the consistency of the solid-liquid mixture. However, it should be defined in order to ensure that the control of the temperature dependence works reliably and predictably. The mixing apparatus may, for example, be a rotating treatment drum with suitable internals (baffles) for promotion of the mixing process.

f) The treated granular green material is dried.

The aim of the drying step is to remove the liquid, if it is volatile, and to consolidate the solid in the channels to give a solid-state plug. The drying typically includes prolonged storage (for example for at least three days) under controlled drying conditions (for example elevated temperature).

g) The temperature dependence of the propellant charge powder is established by adjusting the amount of solid within a setting range from >0 to 0.5% by weight, using, under otherwise identical amounts, a greater amount of solid for more significant lowering of the maximum pressure within the upper temperature range and for more significant raising of the maximum pressure within a lower temperature range of the application temperature range.

It has been found that there is a sensitive range within which the temperature dependence of the maximum pressure can be established through the amount of solid used. Within the setting range, the mobility of the compacted plugs produced in the course of the mixing and drying process can be set as a function of the application temperature. This sensitive range is referred to in the context of the invention as a setting range.

"Graphitizing" in this case means saturating the surface with graphite. In principle, the surface can also be saturated with another solid. However, graphite prevents electrostatic charging of the granules and is therefore preferred. Graphitizing is an operation required in practice for smoothing the surface of the granular green material and rendering it electrically conductive. The amount of graphite depends on the specific surface area of the granular green material. The specific surface area is the ratio between the total surface area (including the channels) of a number (e.g. 100) of individual granules and the weight that these granules take up. The smaller the geometric dimensions of the granular green body, the greater the specific surface area. The greater the number of channels (with otherwise the same external dimensions of the granular material), the greater the specific surface area.

The inventive setting range should not be confused with the range of amounts known for conventional graphitizing. Graphitizing as such is a surface treatment process which does not lead to plug formation. In the case of a combined treatment (plug formation+graphitization), in accordance with the invention, a range of amounts which results from the graphitization amount (for example a maximum of 0.05% by weight) and from the plug formation amount (for example between 0.01 and 0.5% by weight) is employed. The process according to the invention can be applied to a granular green material which has already been graphitized. In this case, the setting range defines the amount of solid which is used in the course of the inventive treatment. However, the graphitizing can also take place simultaneously (in combination) with the inventive treatment. In that case, the amount of solid is calculated from the sum total of the amount of solid required for the graphitizing and the desired amount of solid for control of the temperature dependence, and the desired amount has to be within the setting range of >0 to 0.5% by weight. In the case of combined treatment, it should be emphasized that the solid used need not necessarily consist of graphite. It is sufficient when the surface conductivity can be increased by the solid used (which need not necessarily be graphite). When graphite is also used to increase the surface conductivity in the context of the combined treatment, this amount of graphite need not necessarily correspond to the amount which was used in the past in conventional graphitizing; it may also be less and may be supplemented with an amount of another solid. The solid in the context of the invention may also be a mixture of different substances (for example of graphite and talc).

The main advantage of the process according to the invention is that the temperature gradient of the propellant charge powder can be adjusted in a simple and reliable manner. There are any number of parameters with which the temperature gradient can be influenced. However, none can be handled as easily and reliably as the variation of the amount of solid. Because the solid cannot diffuse into the granular green material and barely reacts chemically, a variation in the amount of solid does not alter the chemical system of the propellant charge powder but merely varies the plug mobility.

The temperature-dependent plug mobility is understood to mean the following: in the operation of igniting the propellant charge powder, the plugs remain at high powder temperature (and hence at rapid burnoff velocity) in the hole channels. Thus, a minimal surface area is available for the burnoff. At low temperature (with slow burnoff velocity), the plugs are all removed by the ignition shockwave, and a maximum surface area is available for the burnoff. Ideally, the product of burnoff velocity times surface area is constant at all firing temperatures, which is equivalent to temperature-independent burnoff characteristics. The inventive propellant charge powder thus provides fewer channels with increasing temperature.

Optionally, the process according to the invention can be performed in two stages. In a first stage, the granular green material is pre-coated with graphite in the manner of a graphitization which serves to increase the conductivity and to prevent the conglutination of the granular green material. After this graphitization, the granular green material is provided for the second process stage, which is formed by the above-described step e). This procedure allows separation of the graphitization from the inventive surface treatment for adjustment of the temperature curve or of the temperature-dependent plug mobility.

It is also conceivable that treatment with graphite is effected after process step e) of the invention. This means that the temperature dependence is first established and then the surface conductivity is increased.

Optionally, the solid may comprise graphite. In this case, the amount of solid corresponds to the sum of the amount of graphite required for the purposes of a graphitization, which serves to increase the conductivity and to prevent the conglutination of the granular green material, plus the amount of solid selected within the setting range. This combined run is very efficient and is generally preferred.

Optionally, the amount of solid is selected within a range of plus/minus 20% based on the optimal formula $$M(\text{solid}) = K\_\text{opt} \times F(\text{specific surface area}) + \text{offset}.$$

In this formula:
M(solid) is the amount of solid in % by weight based on the weight of the granular green material
F(specific surface area) is the specific surface area of the granular green material in area per unit weight and
K_opt=0.0012 [g/mm$^2$] is the factor in weight per unit area and the offset is −0.14.

In principle, the optimal value calculated by the above formula for the minimum amount of solid states what proportion of solid is deposited initially on the surface in the combined process and does not contribute to control of the temperature coefficient. In practice, this optimal value is afflicted with a certain inaccuracy. Deviations in the region of plus or minus 20% should still be considered to be optimal.

It is also possible to work without this optimal value, in which case the performance of the propellant charge powder will gradually deteriorate. What is crucial is to work within the setting range, where the temperature gradient reacts to a change in the amount of solid.

Optionally, the amount of solid is selected within a range of intersection of the temperature gradient curves which define the upper and lower temperature coefficients.

The lower temperature coefficient is defined by the ratio of the maximum pressure p_max(21° C.) at application temperature 21° C. to maximum pressure p_max(−40° C.) at −40° C. Analogously, the upper temperature coefficient is defined by the ratio of the maximum pressure p_max(63° C.) at application temperature 63° C. to maximum pressure p_max(21° C.) at 21° C. (The given temperature values of −40° C., 21° C. and 63° C. can also be selected differently. What is important in this context is merely that the ratio is formed from the maximum pressure values at or close to the lower limit of the application temperature range and at or close to the upper limit of the application temperature range to give a maximum pressure value in a middle region of the application temperature range.)

The range of intersection of the lower and upper temperature gradient curves gives rise to a very flat temperature profile (i.e. a low temperature dependence for the burnoff). The amount of solid need not exactly be at the point of intersection of the two temperature gradient curves. It is sufficient when the solid is selected within a range of amounts which differs by not more than 10% from the point of intersection.

The moderator helps in the initial consolidation of the solid in the channels of the granular green material. There are soluble moderators (which therefore migrate) and insoluble moderators (because they are fixed in a suitable manner). The moderator should be used in a minimum amount. In the plug, virtually no moderator is present any longer after the production process has concluded. For example, only 0.1% by weight of moderator (based on the granular green material) is used. Because the unfixed moderator is distributed within the granular green material, only very little remains in the plug. The plug consists virtually exclusively of solid (at least 90% by weight, especially at least 95% by weight). In the context of the present embodiment, two types of moderators are conceivable, namely a soluble moderator ("type A") and a fixed moderator ("type B"):

The "type A" moderators used are low molecular weight oligomeric substances having good solubility in the solvent and in the propellant charge powder. Moderators of this kind are intercalated between the molecules of the granular green material (for example the NC molecules) and thus aid swelling. In conjunction with the solvent (e.g. alcohol), they cause swelling of the granular green material. In addition, the moderator brings about a certain degree of conglutination of the pulverulent solid before the later drying. However, an excessively high amount of moderator can also lead to conglutination of the granular green material. In general, the amount of moderator selected should be low, in order not to worsen the ballistic stability. The amount of moderator is preferably in the order of magnitude of 0.1-0.2% by weight based on the granular green material. The amount of moderator should be less than 0.5% by weight (based on the granular green material).

The "type B" moderators selected are oligomeric or polymeric substances insoluble in, the granular green material, such that no migration takes place. Substances which can be crosslinked are likewise useful.

The moderators used may be substances which cannot diffuse noticeably within the propellant charge powder matrix after the inventive treatment. This can be achieved in two ways:

Firstly, it is possible, for example, to use moderators which have good solubility in the granular green material matrix and which bear two or more free-radically polymerizable groups. After the moderators have diffused in, they are polymerized. The network which forms is of high molecular weight, insoluble and intertwined with the powder matrix, and hence diffusion-stable.

Low molecular weight, soluble moderators suitable for treatment of double-base and multibase propellant charge powders have a minimum vapor pressure at 21° C. and are liquid. When they are soluble in the low-viscosity liquid according to feature c), they may also be solids. Suitable substance classes include ethers, esters, urethanes, ureas and ketones. Examples are camphor, dibutyl phthalate, diamyl phthalate, centralite, dipropyl adipate, di(2-ethylhexyl) adipate, diphenylurethane, methylphenylurethane, hexanediol diacrylate, ethylene glycol dimethacrylate, etc.

Likewise suitable are oligomeric, soluble moderators such as polyethers and polyesters having molecular weights of 500 to 3000 daltons. Examples are poly-(tetrahydrofuran), polymethyl vinyl ether, poly(oxy-ethylene), polyethylene glycol, poly(butanediol) divinyl ether, polyesters such as SANTICIZER 431, PARAPLEX G-54, or poly[di(ethylene glycol) adipate, polyethylene glycol acrylate, polyethylene glycol methacrylate, polyethylene glycol diacrylate, polyethylene glycol dimethacrylate, polyethylene glycol dimethyl ether, poly(propylene glycol), poly(propylene glycol) acrylate, poly(propylene glycol) diacrylate, poly(propylene glycol) ether, polycaprolactonediol, polycaprolactonetriol and the cooligomers derived therefrom. In the case of the acrylates/methacrylates, no polymerization reactions are conducted.

The free-radically crosslinkable moderators include low molecular weight compounds or oligomers or polymers which bear at least two free-radically polymerizable groups per molecule.

The free-radically crosslinkable moderators also include mixtures of
- low molecular weight compounds or oligomers or polymers having at least one polymerizable group per molecule and
- compounds bearing at least two polymerizable groups.

These compounds are either insoluble in the propellant charge powder matrix and therefore remain at the propellant charge powder surface, or they are soluble and therefore diffuse into the uppermost layer of the propellant charge powder in the course of the inventive treatment. In addition, a suitable thermally activatable free-radical initiator has to be added to the crosslinkable moderator. The initiator should be of such good solubility in the moderator that it is present in homogeneous distribution in the moderator. The treatment conditions and the initiator must be selected such that the initiator as far as possible cannot break down into free radicals during the surface treatment process in the polishing drum. If initiator and polymerizable moderator are present either as a layer on the propellant charge powder surface or diffuse into the outermost propellant charge powder layer, the atmospheric oxygen and some of the oxygen present in the outermost propellant charge powder layer are removed under reduced pressure at room temperature and replaced by inert gas. This is necessary in order that the free-radical reactions (polymerization, crosslinking) proceed without troublesome side reactions and with high yield. Under inert gas, the temperature of the propellant charge powder is increased such that the initiator breaks down very rapidly and completely to free radicals. These free radicals then commence the polymerization or the crosslinking of the moderator.

The free-radical initiators used are preferably substances having a high breakdown stability at a surface treatment temperature, for example room temperature. More particularly, a breakdown time for half of the free-radical former is greater than 10 hours. At the polymerization temperature, in contrast, for example at temperatures around 60° C. to 90° C., the free-radical initiator breaks down rapidly to form the corresponding free radicals; more particularly, a breakdown time for half of the free-radical former is less than 1 hour. This guarantees a rapid, gentle and complete conversion of the polymerizable moderators.

Optionally, the moderator is crosslinked under inert gas at standard pressure, at a temperature of less than 90° C. and over a period of less than six times the breakdown half-life of the free-radical former at this temperature.

The amount of the polymerization initiator used is guided by the amount of the crosslinkable moderator used. For instance, between 0.1 and 5 mol % of initiator based on 1 mol of the crosslinkable moderator is used. Preference is given to amounts of initiator between 1 and 4 mol %.

Examples of suitable initiators are tert-butyl peroxyneodecanoate, di(4-tert-butylcyclohexyl) peroxydicarbonate, tert-butyl peroxypivalate, dilauroyl peroxide, azobis(isobutyronitrile), etc.

Suitable crosslinkable moderators soluble in the propellant charge powder are derivatives of diacrylates, triacrylates, tetraacrylates, dimethacrylates, trimethacrylates, tetramethacrylates, diacrylamides, triacrylamides, dimethacrylamides, trimethacrylamides, divinyl esters, trivinyl esters, divinyl ethers, trivinyl ethers, divinylaromatics, trivinylaromatics, etc.

Examples of low molecular weight, free-radically crosslinkable moderators are hexanediol diacrylate, hexanediol dimethacrylate, ethylene glycol dimethacrylate, triethylene glycol diacrylate, tetraethylene glycol diacrylate, dipropylene glycol diacrylate, trimethylolpropane triacrylate, pentaerythrityl tetraacrylate, etc.

Examples of oligomeric, free-radically crosslinkable moderators are low molecular weight polyethylene glycol diacrylate, low molecular weight polyethylene glycol dimethacrylate, ethoxylated bisphenol A diacrylate, propoxylated neopentyl glycol diacrylate, ethoxylated neopentyl glycol diacrylate, propoxylated glyceryl triacrylate, ethoxylated pentaerythrityl tetraacrylate, etc.

Examples of polymeric, free-radically crosslinkable moderators are polybutadienediol diacrylate, high molecular weight polyethylene glycol diacrylate, high molecular weight polyethylene glycol dimethacrylate, high molecular weight polypropylene oxide diacrylate, etc.

On the other hand, it is possible to use moderators which are of low solubility or are entirely insoluble in the propellant charge powder. These are solid or liquid compounds which are soluble or at least finely emulsifiable in the low-viscosity liquid. The compounds in question may be inert or energetic substances. It has to be a prerequisite that the moderator concentration on the propellant charge powder surface cannot change as a result of sublimation or diffusion. This can be achieved through use of high-melting, low molecular weight or oligomeric compounds, or of polymeric compounds. In addition, in the case of insoluble compounds having polymerizable groups, the volatility can additionally be lowered by a polymerization reaction (as described above) after application to the propellant charge powder granules.

Suitable insoluble moderators are apolar polymers and oligomers, or highly polar polymers and oligomers with or without polymerizable groups.

Examples of these are fully or partly hydrolyzed polyvinyl acetate, polyvinyl alcohol, poly(vinyl alcohol-co-ethylene), polybutadiene, polybutadienediol, polybutadienediol dimethacrylate, polybutadienediol diacrylate, polystyrene, polyvinylpyrrolidone, poly(acrylonitrile-co-butadiene), poly(α-methylstyrene), poly(vinyl alcohol-co-vinyl acetate), poly(vinyltoluene-co-α-methylstyrene), etc.

Optionally, the amount of moderator is selected within a range in which a temperature gradient curve which defines the upper temperature coefficient has a minimum. This has the advantage that the consolidating or conglutinating effect of the moderator is utilized in the best possible way in the initial plug formation, but the stability of the propellant charge powder is not worsened (because of diffusion processes which usually cannot be prevented).

The minimum in the temperature gradient curve, in the context of the invention, should not be understood as a single data point, but as a region of a certain expansion in which the dependence of the maximum pressure on the amount of moderator used is relatively low. The expansion is about 0.1% by weight of moderator. Studies have shown that the minimum is in the region of 0.05-0.2% by weight of moderator (based on the weight of the granular green material).

It is particularly advantageous when the amount of moderator is selected at the lower limit of the minimal range. Studies have shown that the lower limit is between 0.05 and 0.1% by weight of moderator.

However, the amount of moderator selected may also be lower. More particularly, it is possible to completely dispense with the moderator and to use exclusively a low-viscosity volatile solvent as the liquid.

Optionally, the solvent can be provided in an amount which can be taken up completely within the given period in which the granular green material is treated with the liquid and the solid in a mixing apparatus. In that case, the granular green material is treated in a non-suspended manner. Instead, the granular green material is wetted merely adequately and is circulated in the mixing apparatus in this wetted state.

The amount of the liquid is in the range from 0.1 to 5% by weight (based on the amount of the granular green material). Preference is given to an amount in the range from 0.5 to 1% by weight. In the individual case, the amount may also be higher if the solid can nevertheless be incorporated into the channels.

Optionally, to determine the amount of solid, three batches of the granular green material may be treated with different amounts of solid, in which case the amounts of solid differ by a maximum of 0.2% by weight based on the granular green material. In this context, an amount X % by weight can be used for a first batch, an amount X+0.1% by weight for the second batch and an amount X+0.2% by weight for the third batch. X refers, for example, to an amount of solid required for a graphitization. If the granular green material provided has already been graphitized, the X selected may be 0% by weight or very small (e.g. X=0.015% by weight). (The percentages by weight are always based on the weight of the granular green material used.)

On the basis of the temperature gradient curves for the three batches, it is possible to ascertain the range of inter-section of the temperature gradient curves. On this basis, in the specific case (i.e. for the specific application tempera-ture), the optimal amount of solid for the production can be ascertained. An optimal amount will generally be that which leads to substantially temperature-independent characteris-tics of the propellant charge powder. The temperature coef-ficient between, for example, 21 and 63° C. is then 100% plus/minus 2%.

This procedure is based on the finding that the tempera-ture dependence of the propellant charge powder can be controlled within a range having a breadth of typically 0.25% by weight through the variation of the amount of solid. Said setting range may quite possibly be greater than 0.25% by weight in the case of small granular green material geometries (medium caliber), e.g. 0.25-0.5% by weight. In the case of very large granules (large caliber), the setting range may also be narrower, for example 0.1% by weight of solid.

Optionally, the amounts of solid in the batches differ by about 0.1% by weight. This is a good pattern to rapidly and reliably arrive at the range of intersection even in the case of very different executions of the granular green material. The number of batches can also be increased and/or the differ-ence can be reduced in order to more exactly identify the range of intersection.

Alternatively, it is also possible to undertake a coarser or finer subdivision of the solid range in order to define the different batches. It is additionally conceivable to select the amount of solid on the basis of different calculations when optimal setting of the temperature gradients is not important.

Optionally, the amount of solid within the setting range can be selected such that the temperature coefficient in the lower and upper temperature ranges is between 95% and 105%, especially between 97% and 103%. This corresponds to a balanced vivacity of the propellant charge powder. Since, without plug formation, the ratio p_max/p_max(21° C.) within the upper temperature range (e.g. 21° C.-63° C.) is in the order of magnitude of 110%, the result is that an amount of solid which leads to a significant improvement in the thermal characteristics is selected.

Optionally, the amount of solid, for a specific surface area (in the form of an average), can be increased proportionally from >0 to 0.2% by weight, in order to lower the relative maximum pressure (in the form of an average) proportion-ally within the upper temperature range from 105% to 95%. This simplified dimensioning rule leads to comparatively good results by simple means or with a low level of complexity. The dependence of the temperature gradient curve on the amount of solid selected is not truly linear (but rather S-shaped). However, the deviations from linearity within the crucial range are so small that the simplified dimensioning rule leads to good results.

Alternatively, it is also possible to apply other (for example non-linear, S-shaped) dimensioning rules in order to determine the amount of solid required for the desired thermal characteristics.

Optionally, the channels have a characteristic transverse dimension of 0.1-0.2 mm. Within this range, consolidated and anchored plugs can be produced without difficulty; in addition, such transverse dimensions can be produced effi-ciently in an extrusion process. The pulverulent solid, the particle size of which is selected such that it can be incor-porated efficiently into the channels, can settle there only with difficulty in the case of excessively large channel cross sections. In the case of excessively small channel cross sections, the solid can likewise no longer be introduced rapidly into the orifices. The (average) particle size of the solid will typically be much less than 0.2 mm. This means that the particle size is generally at most half as large as the characteristic transverse dimension of the channels, more particularly at most ⅕ as large.

The channels are typically roughly circular, such that the transverse dimension corresponds to the diameter. However, they may also be oval or star-shaped.

Optionally, the solid, according to the transverse dimen-sion of the channels, has a particle size in the range from 0.01 to 100 micrometers, more preferably in the range from 0.1 to 50 micrometers, where the particle size is advanta-geously not greater than 1/10 of the transverse dimension of the channel. However, these dimensions are not obligatory, as the elucidations which follow show.

Since graphite particles are found to be very "mobile" or "sliding", these may, for example, also only be slightly smaller than the transverse dimension of the channels and nevertheless lead to a plug. Graphite particles can also be compacted efficiently, such that it is surprisingly also pos-sible to form solid plugs with relatively large graphite particles.

Optionally, the amount of solid (in the form of an average) can be increased proportionally from >0 to 0.2% by weight, in order to increase the relative maximum pressure within the lower temperature range (in the form of an average) proportionally from 86% to 105%. The considerations explained above regarding the upper temperature range apply mutatis mutandis to the lower temperature range.

Optionally, in the case of a granule die having a diameter in the range of 11-14 mm, a number of channels in the range of 16-24 and a transverse dimension of the channels in the range of 0.14-0.18 mm, the amount of solid is selected as a function of the relative maximum pressure to be achieved according to the curve shown in FIG. 5. 7 or 19 channels are customary, and additionally also 38 or 64 channels.

For a different granule geometry having a different specific surface area, the amount of graphite is altered correspondingly, such that any additional or reduced demand caused by the graphitization is compensated for. According to this dimensioning rule, it is possible to control the temperature dependence without laborious tests.

Optionally, in the case of a granular green material having a specific surface area in the region of 600 mm²/g plus/minus 20%, the solid may be selected within a range between 0.12 and 0.21% by weight based on the granular green material. With these amounts, it is simultaneously possible to achieve graphitization and an optimal temperature independence.

It is also possible to work outside the preferred range specified if lesser temperature effects are desired.

Optionally, to assess the amount of moderator, it is possible to proceed from the rule that an increase from 0 to 0.4% by weight (based on the granular green material) within the lower temperature range lowers the relative maximum pressure proportionally from 97% to 88%.

A further optional dimensioning rule is that the amount of moderator is increased from 0 to 0.15% by weight in order to lower the relative maximum pressure within the upper temperature range from 105% to 100%. In this way, without any great test complexity but with good reliability, the amount of moderator appropriate for the desired temperature effect can be determined. This is helpful especially when the amount of moderator is to be kept to a minimum.

In certain cases, the moderator substance can be selected such that it acts simultaneously as a phlegmatizer. In such cases, additional criteria should be noted for the assessment of the amount of moderator. In that case, it is possibly better to apply the above dimensioning rule only to a limited degree, if at all.

Optionally, the moderator can be used in an amount of 0.05-0.2% by weight, especially of 0.1-0.15% by weight. These amounts of moderator are relatively low and therefore preferred. In the case of such an assessment, good results can also be achieved with regard to the temperature gradients when the formulation of the granular green material is not matched to the optimal amount of moderator through test series.

The procedure for finding the optimal amount of solid may be as follows:

The starting material is the granular green material which has been produced from a particular batch. In the respect that the entire granular green material has been extruded from the same batch (which should be of maximum homogeneity), the individual granules do not differ substantially from one another in relation to composition and properties. At least one first and one second portion are processed in a particular mixing and drying process with a particular test amount of solid and two different test amounts of moderator. This is used to find a minimal range for a temperature gradient within the upper temperature range. In other words: the burnoff characteristics are virtually unchanged within the upper temperature range when the amount of moderator is altered within the minimal range. Outside the minimal range, the temperature gradient, however, depends on the amount of moderator used. A suitable amount of moderator is selected.

In a further stage, at least two further portions are taken from the batch of granular green material mentioned and processed in the particular mixing and drying process with the amount of moderator selected (within the minimal range) and two different test amounts of solid. The amount of moderator has thus been selected within the minimal range found in the previous process stage. The at least two treatments with different amounts of solid is thus used to find a range of intersection of the upper and lower temperature gradient curves.

Thereafter, a production amount can be taken from the batch mentioned and processed in the particular mixing and drying process with the selected amount of moderator and the optimal amount of solid.

In the context of extensive production, several batches of the granular green material can also be produced and processed. In that case, it is not absolutely necessary to follow the above process for each batch of the granular green material. If the deviations from the previous batches are not negligible but not too great either, it is possible to check by a simple test process whether the amount of solid (and optionally of moderator) is still correct.

Optionally, the mixing and drying process comprises the following steps:
a) introducing granular green material, solid and low-viscosity liquid into a mixing apparatus,
b) the solid is a substance whose melting point is at least 10° C., especially 20° C., above a maximum use temperature of the propellant charge powder, which is inert toward the granular green material, and which is used in an amount within the range defined by K_min and K_max according to the following formula:

$$M(\text{solid})=K\_min \times F(\text{specific surface area})+\text{offset}$$

$$M(\text{solid})=K\_max \times F(\text{specific surface area})+\text{offset}$$

is selected, where
M(solid) is the amount of solid in % by weight based on the weight of the granular green material
F(specific surface area) is the specific surface area of the granular green material in area per unit weight and
K_min=0.0009 [g/mm²]
K_max=0.0014 [g/mm²]
with offset=−0.14.
The optimal amount of solid is:

$$M(\text{solid})=K\_opt \times F(\text{specific surface area})+\text{offset}$$

where:
K_opt=0.0012 [g/mm²]
and offset=−0.14.
c) the moderator is a substance which has good chemical compatibility with the base formulation of the granular green material and has a low volatility, i.e. vapor pressure, at 21° C. of <$10^{-2}$ bar, and is used in an amount of less than 0.5% by weight based on the weight of the granular green material; the amount of moderator is preferably not more than 0.2%;
d) the low-viscosity liquid is a solvent or solvent mixture which can very efficiently dissolve or finely emulsify the plug-stabilizing moderator and which is able to swell the granular green material, and is used in an amount of 0.1% by weight to 5% by weight, based on a weight of the granular green material,
e) incorporating the solid gradually into the channels of the granular material under the action of a pressure exerted by the powder material through rotation of the mixing apparatus,
f) then removing the liquid from the granular material, for example by vaporization, with continued processing by the mixing apparatus,
g) drying the granular green material thus treated at elevated temperature, h) in such a way that the nonvolatile solid present in the channel, through compaction, produces a plug consisting to an extent of 90%, especially to an extent of 95%, of the solid used and having a temperature-dependent mobility, in that the plug can withstand an ignition pressure wave in a controlled manner, i) in such a way that a higher mobility exists at lower application temperature than at higher application temperature, such that the plug permits stronger hole burnoff at lower application temperature than at higher application temperature, so as to result in a reduced temperature dependence of a propellant charge powder burnoff.

Optionally, the amount of moderator can be selected as a function of the relative maximum pressure to be achieved according to the curve in FIG. 4. In this context, it is crucial that, in the lower range (−40° C. to +21° C.) of the application temperature, there exists a minimum in the temperature gradient having a breadth of typically not more than 0.2% by weight of moderator based on the granular green material, especially of 0.1% by weight of moderator. The amount of moderator is preferably selected at a minimum level, i.e. at the lower edge of the minimal range.

Optionally, one or more of the following substances or else mixtures thereof can be used as the solid:

graphite, talc, titanium oxide, carbon black, potassium sulfate, potassium cryolite, sodium cryolite, calcium carbonate, tungsten trioxide, molybdenum trioxide, magnesium oxide, boron nitride, acardite, centralite, calcium carbonate, oxalamide, ammonium carbamate, ammonium oxalate, cellulose acetate butyrate, potassium perchlorate, potassium nitrate, barium nitrate, sodium oxalate, fullerenes, or polymers and copolymers with or without functional groups, linear, branched or crosslinked.

Optionally, the treatment of the granular green material can be effected by mixing the solid, the moderator and the liquid in the mixing apparatus at a temperature in the range from 0° C. to 90° C. over a treatment period between 5 minutes and 4 hours, especially between 10 minutes and 120 minutes. The rotation speed of the mixing apparatus may, for example, be between 2 and 30 revolutions per minute.

Optionally, the treatment can be conducted in such a way that the mixing apparatus remains sealed gas-tight during a contact time, and that it is subsequently open for vaporization of the liquid over a particular period in the range from 5 minutes to 4 hours, especially between 10 minutes and 120 minutes. Rather than by vaporization, the liquid can also be removed through reduced pressure or through gas purging.

Optionally, the solid can first be applied and distributed homogeneously over the entire surface of the granular green material, and then a solution composed of the low-viscosity liquid and the moderator can be added.

An inventive propellant charge powder has a granular material with a granular green material die with a plurality of continuous channels each having a characteristic transverse dimension of not more than 0.3 mm and opening at an outer surface of the granular green material. In the channels are plugs composed of compacted solid particles. The solid is selected such that it is stable within the application temperature range and is inert toward the granular green material. The particle size is such that the solid particles can be introduced into the continuous channels by a mixing process in the context of the invention. The plug consists essentially (i.e. virtually exclusively) of the solid. Since the solid retains its solid-state structure over the entire application temperature range and is inert toward the granular green material, it has long-term stability. There is neither diffusion of perceptible amounts into the granular green material nor softening of the solid. More particularly, no moderators or phlegmatizers (apart from small traces) are present in the plug.

The channels are each closed by a cover having a thickness in the range of 10-20 µm (micrometers) on which rests a plug which extends into the respective channel. The plug consists of consolidated solid particles and extends into the channel over a length distinctly greater than the transverse dimension. The plug essentially fills the channel cross section. However, it cannot be assumed that the consolidated plug body is joined to the channel over its entire length.

The amount of solid present in the covers and the plugs is within the setting range from >0 to 0.5% by weight (based on the granular green material), the temperature gradient of the propellant charge powder being given by the amount of solid according to FIG. 1.

The plug may but need not comprise graphite. The finished propellant charge powder has graphite on its surface in order to prevent electrostatic charging and to smooth the surface.

Optionally, the plug comprises a small proportion of energetic solid, especially nitrocellulose, hexogen octogen, nitroguanidine, nitrotriazole, ethylenedinitramine, ethyl tetryl, ammonium picrate, trinitrotoluene, trinitrobenzene, tetranitroaniline, etc. These solids may also include strong oxidizing agents, such as ammonium nitrate, potassium nitrate, ammonium perchlorate, potassium perchlorate, etc. More particularly, the energetic solid may correspond to the abraded granular green material produced in the mixing process.

The plug has a melting temperature above a production, storage and/or application temperature, especially above 90° C. Thus, it does not comprise any moderators liquid within the application temperature range.

Preferably, the granular green material has at least 7 (e.g. 19 or else more, especially 38 or 64) axially continuous channels. The cavity of a channel concluded by the plugs may have a cavity volume several times the volume of a plug.

With the inventive use of a solid or through the process according to the invention, it is possible to produce a propellant charge powder in which the specific surface area is greater than 420 mm$^2$/g and the amount of solid is greater than 0.15% by weight, especially greater than 0.2% by weight, and in which the solid is selected within a setting range of up to 0.5% by weight according to a temperature dependence to be achieved, such that compaction of the nonvolatile solid present in the channel forms a plug consisting principally of the solid used and having a temperature-dependent mobility, in that it can withstand an ignition pressure wave in a controlled manner.

It is also possible with the inventive use of a solid, or through the process according to the invention, to produce a propellant charge powder in which the specific surface area is less than 310 mm$^2$/g and the amount of solid is at least 0.05% by weight for an advantageous effect and greater than 0.075% by weight, frequently greater than 0.2% by weight, for an optimal effect. The solid is selected according to a temperature dependence to be achieved within a setting range of up to 0.5% by weight. Compaction of the nonvolatile solid present in the channel gives rise to a plug which consists principally of the solid used and brings about a more temperature-independent application of the propellant charge powder overall.

The invention also encompasses a propellant charge powder in which the amount of solid is selected as a function of the specific surface area of the propellant charge powder such that solid-state plugs which are compacted and anchored in the channels and are composed of solid having temperature-dependent mobility are formed, and such that the temperature gradient is within the range of intersection of the upper and lower temperature gradient curves.

The invention also relates to a propellant charge powder which is characterized by the following features:
a) The physical structure is formed by a swellable granular green material having a given geometric configuration with at least one continuous channel. The channel has a characteristic transverse dimension of not more than 0.3 mm and opens at an outer surface of the granular green material.
b) The propellant charge powder preferably has a specific surface area greater than 420 mm$^2$/g. It may also be less than 310 mm$^2$/g. However, other granule sizes are not ruled out.
c) On the surface and within the at least one channel is a solid which is stable within the application temperature range and is inert toward the granular green material and which has a particle size which can be introduced into the continuous channels. The particle size is, for example, smaller than one half diameter of the channel. From a chemical/physical point of view, the solid has the property that it can be compacted in the course of a mixing and drying process.
d) The amount of solid is dependent on the specific surface area and is greater than 0.05% by weight, preferably greater than 0.075% by weight, more preferably greater than 0.15% by weight, frequently greater than 0.2% by weight, and is within a setting range from >0% by weight up to 0.5% by weight according to a temperature dependence to be achieved.
e) Within the channel is a compacted and anchored portion of the nonvolatile solid. This forms a plug consisting principally of the solid used and optionally of the moderator and having a temperature-dependent mobility, in that the plug can withstand an ignition pressure wave in a controlled manner.
f) Optionally, a liquid which can swell the granular green material and is present in homogeneous distribution in the propellant charge powder at the end of the production of the propellant charge powder is present in the propellant charge powder. The chemical composition of the granular green material and the liquid are thus matched to one another such that the granular green material can swell. The liquid contains not more than 0.5% by weight (based on the weight of the granular green material) of an oligomeric or polymeric substance which serves as a moderator. Another portion of the liquid may be a low-viscosity solvent.
g) The propellant charge powder has a setting range for the solid of >0 to 0.5% by weight for establishment of the temperature dependence of the propellant charge powder, the amount of solid being set within the setting range for formation of plugs. The setting range is determined by, under otherwise identical conditions, using a greater amount of solid to achieve more significant lowering of the maximum pressure within an upper temperature range and to achieve more significant raising of the maximum pressure within a lower temperature range of the application temperature range.

The finished propellant charge powder has a particular solids content. This is within the setting range inherent to the specific propellant charge powder. This means that, under otherwise identical conditions, it is also possible to achieve a propellant charge powder with a different (but again particular) solids content. This different solids content is likewise within the setting range. A characteristic feature of the inventive setting range is that the maximum pressure within the upper temperature range (in which the powder can be employed) is lowered when the amount of solid selected is higher. And within the lower temperature range, the maximum pressure is raised when the amount of solid is raised. This property that the maximum pressure is set solely through the amount of solid is caused by the structure and anchoring of the inventive plug in the channel. Through an analysis of the propellant charge powder, it is possible to determine the setting range that it has. Thus, the setting range is an industrially determinable feature of the inventive propellant charge powder.

Preferably, the amount of solid in the propellant charge powder (in the form of an average) is selected as follows:

$$M(\text{solid}) = K\_\text{max} \times F(\text{specific surface area}) + \text{offset}$$

where
$M(\text{solid})$ is the amount of solid in % by weight based on the weight of the granular green material
$F(\text{specific surface area})$ is the specific surface area of the granular green material in mm$^2$/g
$K\_\text{max} = 0.0014$ [g/mm$^2$]
$\text{offset} = -0.14$, such that the relative maximum pressure has been lowered roughly (i.e. in the form of an average) proportionally within the upper temperature range from 105% to 95%, or that the amount of solid (in the form of an average) has been selected proportionally from >0 to $M(\text{solid}) = K\_\text{max} \times F(\text{specific surface area}) + \text{offset}$, such that the relative maximum pressure within the lower temperature range has been increased roughly proportionally from 87% to 105%.

Ideally treated propellant charge powders exhibit the best possible temperature independence of the burnoff characteristics. They are within the point of intersection of the upper and lower temperature gradient curves.

The scope of the invention also includes provision of propellant charge powders as a mixture of at least two differently treated propellant charge powders (PCPa, PCPb). Each of the different propellant charge powders has been produced by the production process according to the invention. The at least two differently treated propellant charge powders are mixed in such a ratio that the mixture thereof behaves like an optimal propellant charge powder having a solids content within the range of intersection of the upper and lower temperature gradient curves. Preferably, the differently treated propellant charge powders are based on the same granular green material (geometry, chemical composition).

It is also possible propellant charge powders as a mixture of untreated granular green material (GGM) and at least one intensively treated propellant charge powder (PCPb) which has been produced by the process according to the invention. The two propellant charge powders are mixed in such a ratio that the mixture thereof behaves like an optimal propellant charge powder having a solids content within the range of intersection of the upper and lower temperature gradient curves.

Preferably, the mixture is calculated on the basis of the assumption that the temperature gradient curve between the two propellant charge powders is a straight line on which the points for the propellant charge powders lie. In other words: the influence of each of the at least two propellant charge powders on the common temperature gradient is assumed to be linear, and the mixture is determined on the basis of the formula "amount of PCPa"/"amount of PCPb"=$\Delta b/\Delta a$ where Δa is the difference between the relative maximum pressure Pmax/Pmax(23° for the PCPa and the relative maximum pressure Pmax/Pmax(23° for the propellant charge powder at the point of intersection of the S/Z curves (and Δb, analogously, is the relative pressure differential for PCPb).

Preferably, propellant charge powders treated with different intensity are thus mixed with one another in order to arrive at a propellant charge powder with optimal behavior.

A mildly treated PCPa is thus mixed with an intensively treated PCPb. A mildly treated PCPa has a lower solid level than an ideally treated PCP; its maximum gas pressure has been lowered only slightly. In contrast, an intensively treated PCPb has a higher solid level than an ideally treated PCP. Its maximum gas pressure has been distinctly lowered and is below the point of intersection of the upper and lower temperature gradient curves. PCPb exhibits inverse thermal characteristics. A mixture of PCPa and PCPb produced in a favorable ratio gives a PCP with temperature-independent burnoff characteristics corresponding to those of an ideally treated PCP.

In a simple case, the influence of the solid on the propellant charge powder can be assumed to be linear at least within the setting range. For this purpose, the difference of the maximum gas pressure from the point of intersection of the S/Z curves is determined for the PCP treated in each case, i.e. Δa for PCPa and Δb for PCPb. For virtually optimal characteristics of the propellant charge powder, PCPa and PCPb are mixed with one another in a ratio (by weight) inversely proportional to the differences in the maximum pressure:

amount(PCPa)/amount(PCPb)=Δb/Δa.

It is also possible, by the same principle, to mix an untreated granular green material GGM with an intensively treated PCPb.

The linear relationship applies to simple examples and gives good results. If very exact setting is required, it may be advantageous also to take nonlinear behavior into account.

It is likewise possible to mix more than just two granular materials treated with different intensity, or an intensively treated and an untreated granular material, with one another in order to arrive at a propellant charge powder having temperature-independent burnoff characteristics.

Further advantageous embodiments and combinations of features of the invention are apparent from the detailed description which follows and the totality of the claims.

BRIEF DESCRIPTION OF THE DRAWINGS

The drawings used to illustrate the working example show:

FIG. 4 a diagram of the upper limit for solid as a function of the drum used, with different forms of baffles;

FIG. 9a, b schematic diagrams of the concentration of the moderator in the granular green material matrix before (a) and after (b) the heat treatment;

FIG. 10a, b effect of the granular green material treatment in the weapon;

FIG. 11 a diagram of the temperature gradient curves as a function of the amount of solid used for PCP2 for production of real propellant charge powders by mixing.

In principle, identical parts are given identical reference numerals in the figures.

WAYS OF EXECUTING THE INVENTION

Figure 1:
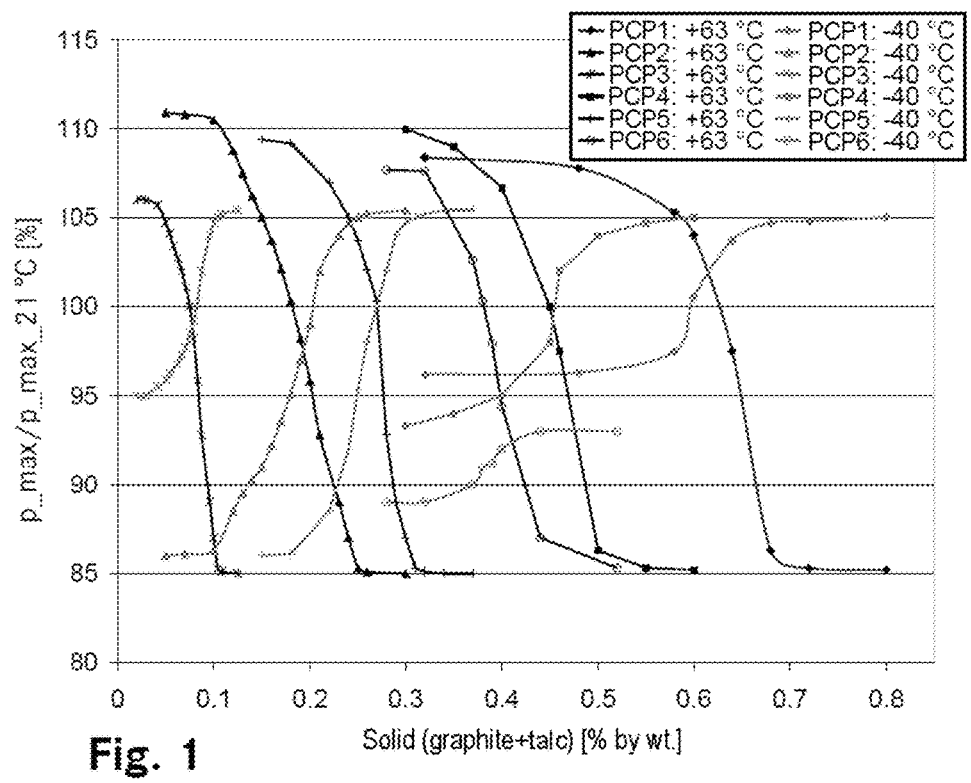
FIG. 1 a diagram of the temperature gradient curves as a function of the amount of solid used for six different propellant charge powders.

FIG. 1 shows the temperature gradient curves for six different propellant charge powders PCP1-PCP6. On the abscissa is plotted the total solid added in % by weight based on the amount of the granular green material, and on the ordinate the temperature gradient in percent. The amount of solid is such that it serves both for production of the inventive plugs and for polishing of the surface.

The propellant charge powders shown in FIG. 1 are characterized as follows:

| Designation | PCP1 ♦ | PCP2 ▲ | PCP3 x | PCP4 ■ | PCP5 + | PCP6 ○ |
|---|---|---|---|---|---|---|
| Granular green material diameter (mm) | 5.5 | 12.3 | 13.89 | 8.65 | 9.91 | 7.99 |
| Number of channels | 19 | 19 | 19 | 19 | 19 | 19 |
| Channel diameter (mm) | 0.17 | 0.18 | 0.18 | 0.19 | 0.18 | 0.18 |
| Specific surface area (mm$^2$/g) | 597.47 | 306.06 | 143.03 | 437.5 | 379.4 | 455.07 |

For each of the six propellant charge powders PCP1 to PCP6, the temperature gradient curves in the lower and upper temperature ranges of the application temperature range are given. The application temperature range in these examples extends from −40° C. to +63° C. The lower temperature range is understood to mean the range from −40° C. to +21° C., and the upper temperature range to mean the range from +21° C. to +63° C. (The limits of the temperature ranges can also be defined differently. The invention does not depend directly on the definition of the ranges.) The temperature gradient in the lower temperature range is defined such that the ratio of the maximum pressure p_max(−40° C.) at the lower limit (−40° C.) of the lower temperature range to maximum pressure p_max(+21° C.) at the upper limit (+21° C.) of the lower temperature range is formed. Analogously, the temperature gradient in the upper temperature range is defined by the ratio of the maximum pressure p_max(+63° C.) at the upper limit (+63° C.) to maximum pressure p_max(+21° C.) at the lower limit of the upper temperature range. The pressure values are determined in a manner known per se in a pressure bomb test. (The temperature gradient need not be based on the limits of the respective temperature ranges. It is also possible to use measurement temperatures which are close to the temperature limits but are still within the respective temperature range.)

The temperature gradient curves arise from the fact that a particular propellant charge powder formulation having particular production parameters is processed, and that only the solids content is altered stepwise for the treatment. For each solids content, the lower and upper temperature gradients are entered as the value.

Analogously, it is possible to determine the ratio of the vivacities from pressure bomb tests. The curves from firing data for a weapon and a pressure bomb are very similar; they do not differ in the x values and are only 2% lower in the y values. Some of the curves based on pressure bomb results have been converted to weapon values with determined correlation factors.

The propellant charge powders described are double- or triple-base.

In the case of double-base formulations, the proportion of nitrocellulose is between 50 and 65% by weight, where the nitrogen content of the nitrocellulose varies between 12.6 and 13.5%. The proportion of the energetic plasticizer is matched to the nitrocellulose content and is 35-50% by weight, meaning that the more nitrocellulose is present, the less of the energetic plasticizer is used. The energetic plasticizers used are nitroglycerine, DEGDN or mixtures thereof. Likewise used as plasticizers are NENA derivatives such as Me-NENA, Et-NENA, Bu-NENA and mixtures thereof. Further additives such as stabilizers or flame retardants are normally present in proportions of less than 2% by weight.

The nitrocellulose content in triple-base formulations is 40 to 50% by weight. The proportion of the energetic plasticizers varies between 20 and 35% by weight. It is possible to use the same plasticizers as in the case of production of the double-base propellant charge powders. In addition, crystalline components such as RDX or nitroguanidine or a mixture of the two components are used. The proportion thereof is 15-30% by weight. Additional ingredients are additives such as stabilizers and/or flame retardants, which normally do not exceed a proportion of 2% by weight.

PCP1-PCP6 were produced according to a double- or triple-base formulation and treated further as follows:

PCP1: A rotary drum was initially charged with 55 kg of granular green material in 19-hole geometry, having a diameter of 5.5 mm, a hole diameter of 0.17 mm and a specific surface area of 597.47 mm$^2$/g, and heated to 30° C. While rotating at 13.5 rpm, a 50:50 mixture of talc and graphite was added to the warm granular green material, with variation in the total amount of solid between 0.3 and 0.8% by weight (165-440 g). As soon as the solids were distributed homogeneously over the granular green material, 788 g of solvent (ethanol:water, 3:1; about 17 ml per kg of granular green material) and 55 g of polytetrahydrofuran (0.1% by weight) were added and mixed with the drum closed at 30° C. over the course of 60 min. Thereafter, the lid was removed and the solvent was evaporated off while rotating over the course of 30 min. The treated granular green material was stored at about 55° C. until the concentration gradient of the phlegmatizer was lower than the critical gradient determined (about 90 h).

PCP2: A rotary drum was initially charged with 55 kg of granular green material in 19-hole geometry, having a diameter of 12.3 mm, a hole diameter of 0.18 mm and a specific surface area of 306.06 mm$^2$/g, and heated to 30° C. While rotating at 13.5 rpm, 50 g of talc (0.10% by weight) were added to the warm granular green material, and the graphite content was varied from 0 to 0.2% by weight (0 to 16 g). For the samples having total solids content less than 0.1% by weight, the amount of talc added was reduced correspondingly. As soon as the solids were distributed homogeneously over the granular green material, 695 g of solvent (ethanol:water, 3:1; 15 ml per kg of granular green material) and 55 g of polytetrahydrofuran (0.1% by weight) were added and mixed with the drum closed at 30° C. over the course of 60 min. Thereafter, the lid was removed and the solvent was evaporated off while rotating over the course of 30 min. The treated granular green material was stored at about 55° C. until the concentration gradient of the phlegmatizer was lower than the critical gradient determined (about 70 h).

PCP3: A rotary drum was initially charged with 55 kg of granular green material in 19-hole geometry, having diameter of 13.89 mm, a hole diameter of 0.18 mm and a specific surface area of 143.03 mm$^2$/g, and heated to 30° C. While rotating at 13.5 rpm, graphite was added in an amount of 0.02 to 0.125% by weight (11 to 69 g) to the warm granular green material. As soon as the solid had been distributed homogeneously over the granular green material, 512 g of solvent (ethanol:water, 3:1; 11 ml per kg of granular green material) and 55 g of polytetrahydrofuran (0.1% by weight) were added and mixed with the drum closed at 30° C. over the course of 60 min. Thereafter, the lid was removed and the solvent was evaporated off while rotating over the course of 30 min. The treated granular green material was dried at about 55° C. over the course of 70 h.

PCP4: A rotary drum was initially charged with 20 kg of granular green material in 19-hole geometry, having a diameter of 8.65 mm, a hole diameter of 0.19 mm and a specific surface area of 437.5 mm$^2$/g, and heated to 30° C. While rotating at 13.5 rpm, a 50:50 mixture of talc and graphite was added to the warm granular green material, with variation in the total amount of solid between 0.3 and 0.6% by weight (60-120 g). As soon as the solid had been distributed homogeneously over the granular green material, 312 g of solvent (ethanol:water, 3:1; 18 ml per kg of granular green material) and 20 g of polytetrahydrofuran (0.1% by weight) were added and mixed with the drum closed at 30° C. over the course of 60 min. Thereafter, the lid was removed and the solvent was evaporated off while rotating over the course of 30 min. The treated granular green material was dried at about 55° C. over the course of 70 h.

In order to be able to determine the connection between amount of solid and specific surface area, the amount of propellant charge powder in the treatment has to be kept constant because it likewise influences the amount of solid to be used. The more propellant charge powder is present in the drum, the smaller the amount of solid required. This can be explained by the mass pressure and the associated improvement in compaction of the solid in the holes. Therefore, a test experiment with 55 kg of granular green material of the described was conducted. It was found that the amount of solid to establish the same effect is reduced by 12% compared to the use of 20 kg of propellant charge powder.

PCP5: A rotary drum was initially charged with 55 kg of granular green material in 19-hole geometry, having a diameter of 9.91 mm, a hole diameter of 0.18 mm and a specific surface area of 379.4 mm$^2$/g, and heated to 30° C. While rotating at 13.5 rpm, a 50:50 mixture of talc and graphite was added to the warm granular green material, with variation in the total amount of solid between 0.15 and 0.37% by weight (82.5-203.5 g). As soon as the solids had been distributed homogeneously over the granular green material, 670 g of solvent (ethanol:water, 3:1; 14 ml per kg of granular green material) and 77 g of polytetrahydrofuran (0.14% by weight) were added and mixed with the drum closed at 30° C. over the course of 60 min. Thereafter, the lid was removed and the solvent was evaporated off while rotating over the course of 30 min. The treated granular green material was dried at 55° C. over the course of about 70 h.

PCP6: A rotary drum was initially charged with 55 kg of granular green material in 19-hole geometry, having a diameter of 7.99 mm, a hole diameter of 0.18 mm and a specific surface area of 455.7 mm$^2$/g, and heated to 30° C. While rotating at 13.5 rpm, a 50:50 mixture of talc and graphite was added to the warm granular green material in an amount of 0.28 to 0.52% by weight (154 to 286 g). As soon as the solids had been distributed homogeneously over the granular green material, 927 g of solvent (ethanol:water, 3:1; 19.5 ml per kg of granular green material) and 55 g of polytetrahydrofuran were added and mixed with the drum closed at 30° C. over the course of 60 min. Thereafter, the lid was removed and the solvent was evaporated off while rotating over the course of 30 min. The treated granular green material was dried at 55° C. over the course of about 70 h.

It is apparent from FIG. 1 that, for each propellant charge powder formulation, there exists a concentration range for the solid in which the upper and lower temperature gradient curves overlap or cross. The upper temperature gradient curve (the "hot branch") proceeds from higher to lower values with increasing solids content; in contrast, the lower temperature gradient curve (the "cold branch") runs from lower to higher values with increasing solids content. For PCP1 the point of intersection is at around 0.6% by weight of solid, for PCP2 at around 0.2% by weight and for PCP3 at around 0.08% by weight. The point of intersection for PCP4 is at 0.45% by weight and that for PCP5 at 0.27% by weight.

It should be noted that, for PCP6, the ratio of the vivacities at 21° C. and −40° C. was not influenced as strongly by the solids content. The vivacity at −40° C., when the amount of solid was increased from 0.25 to 0.85% by weight, rose only from 89% to 93% of the vivacity at 21° C. The point of intersection with the upper temperature gradient curve, which runs as expected, is at 0.42% by weight.

Moreover, it is apparent from FIG. 1 that, in the region of the point of intersection, there is a significant change in the temperature gradients when the amount of solid used is altered. A significant change in this context is regarded as a slope which, in terms of magnitude, is greater than 20. In addition, there are always ranges of amounts of solid in which the temperature gradient is virtually unchanged in spite of a change in the amount of solid. In these ranges, the curves have slopes below 20 in terms of magnitude. That range within which there is a dependence of the temperature gradient on the amount of solid is referred to in the context of the invention as the setting range. In other words: within the setting range, it is possible to influence the temperature gradient through the change in the amount of solid. The temperature gradient can thus be controlled or determined by the solids content alone (under otherwise identical conditions).

The starting value for the relative maximum pressure of the merely graphitized propellant charge powder depends on the temperature gradient of the untreated granular material and is formulation-specific. The setting range depends on the specific surface area of the propellant charge granules. The specific surface area (area per unit weight) is determined by the geometry (including the number of channels) and the bulk material volume. In the case of coarse granules (having a low specific surface area, for example in the region of 100 mm$^2$/g), the setting range is relatively narrow (e.g. 0.06% by weight in breadth), whereas the setting range in the case of fine granules (having a large specific surface area of, for example, 1000 mm$^2$/g) may quite possibly have a breadth of 0.5% by weight (not depicted). Moreover, the setting range, for example in the case of 19-hole powders, is higher than in the case of 7-hole powders, since more solid is required in the case of a greater number of channels to fill all the channels.

The temperature gradients in the upper temperature range decrease with increasing amount of solid. In the case of the largest granules (PCP3), the upper temperature gradient, i.e. the "hot branch", begins at about 107% and then drops in the manner of a "Z curve" to 85%. The same temperature gradient for the middle granules (PCP2) drops from about 111% (at 0.1% by weight of solid) to 85% (at 0.25% by weight of solid). The "hot branch" for PCP5 granules has a similar profile, dropping from 109% (at 0.16% by weight of solid) to 85% (at 0.32% by weight of solid). Also of comparable order of magnitude is the upper temperature gradient of the PCP6 granules, which drops from about 110% (at 0.3% by weight of solid) to 85% at 0.52% by weight of solid. For the PCP4 granules, the curve runs from 110% (at 0.7% by weight of solid) to 85% (at 0.55% by weight). In the case of the smallest propellant charge powder (PCP1), the "hot branch" starts at about 108% (at 0.4% by weight of solid) and drops to 85% (at 0.7% by weight of solid).

In the lower temperature range, the temperature gradient curves each rise in an S shape. The "cold branch" for PCP3 starts at about 95% and rises to 105%. The curves for PCP2 and PCP5 rise from 86% to likewise 105%. The corresponding curves for PCP4 and PCP1 start at 93% and 97% respectively, and likewise rise to about 105%. Only for PCP6 is the "cold branch" noticeably flat. It runs from 89% to 93%, and cannot be influenced further by further addition of solid. The different behavior can be accounted for by a different formulation of the granular green material. While PCP1-PCP5 comprise combinations of nitroglycerine (NGL) and diethylene glycol dinitrate (DEGDN) or NENA, only DEGDN is present as the sole plasticizer (blast oil) in the matrix of PCP6. It is known that, compared to other propellant charge powders, the DEGDN powders do not become brittle even at −40° C. and have a certain elasticity. Thus, PCP6 takes the form of a granular green material formulation which remains flexible and does not become brittle. PCP6 shows behavior in the lower temperature range ("cold branch") which leads to the conclusion of a significant influence of the formulation.

Overall, it can be stated that the smaller the granule size, the greater the specific surface area and the broader the setting range.

However, the setting range in the case of propellant charge powders having high specific surface area cannot be separated cleanly from the pure saturation of the surface of the propellant charge powder. A broad transition range is established, in which the surface is not yet saturated but solid already penetrates into the channels. This effect is shown in the present case, for example in PCP4 and PCP1.

This relationship can be used to arrive at optimal propellant charge powders in a controlled manner. The temperature dependence of a propellant charge powder is at its lowest when the temperature gradient curves intersect. In this context, it should be noted that the given curves arise through statistical evaluation of a large number of pressure bomb tests. This means that the temperature gradient for a given amount of solid need not exactly correspond to the figure that can be read off from FIG. 1. Instead, the individual temperature gradients are scattered to a certain degree. Moreover, the position of the crossing point can move within certain limits when the production conditions are altered significantly. However, what is crucial is that there exists an optimum under otherwise identical conditions, and that this optimum can be found reliably in each individual case by a test method described below.

The temperature gradient curves can undergo a certain change when moving from the pressure bomb test to the specific weapon system. With the inventive relationships, however, even in the case of this transition, the power optimum can be attained in a controlled manner. With a correlation factor found, the curves based on pressure bomb tests and those on weapon tests can be interconverted. If, in a particular production batch, the temperature gradient, for example, is inverted, it is possible through a reduced amount of solid in the next batch to aim for an opposite temperature gradient, such that the mixing of the two batches gives rise to the desired minimum temperature dependence.

Figure 2:
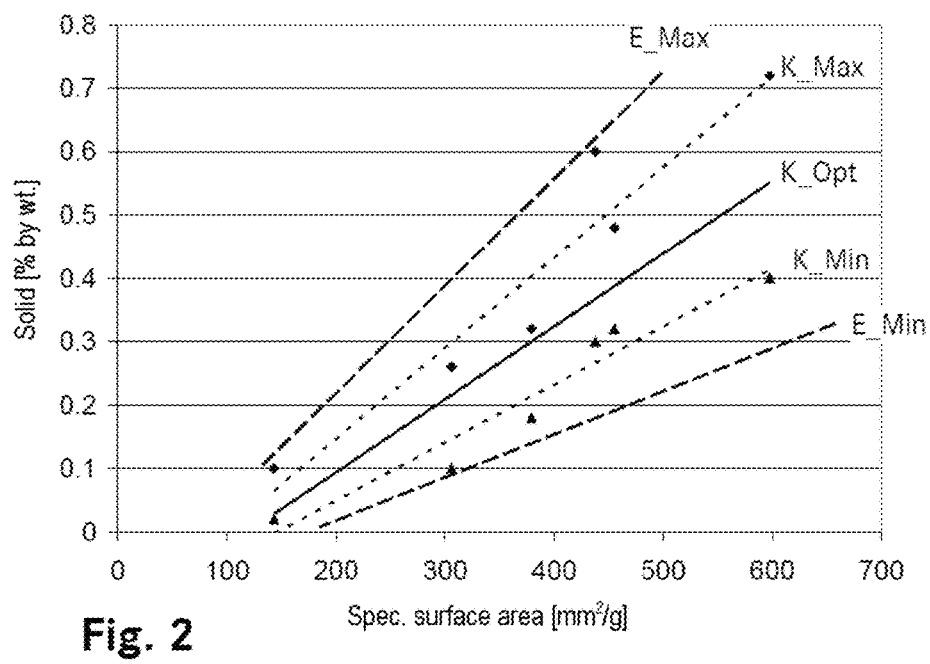
FIG. 2 a diagram of the optimal amount and of the lower and upper limits for solid as a function of the specific surface area of the propellant charge powder in a treatment which includes the polishing of the surface.

FIG. 2 shows the relationship between the specific surface area ($mm^2/g$) and the averaged minimum (min.) and averaged maximum (max.) amount of solid (in % by weight based on the granular green material) in the specific surface area range of about 150-600 $mm^2/g$ when the surface is also polished together with the inventive plug generation. These values can be used to find the optimal amount (opt.) of solid. In addition, the overall setting range E is shown.

It is clearly apparent that the lower and upper limits for the solid required are roughly proportional to the specific surface area. It can be inferred from this that:

$M(\text{solid})=K\_min \times F(\text{specific surface area})+\text{offset}$ $M(\text{solid})=K\_max \times F(\text{specific surface area})+\text{offset}$ The minimum amount of solid is calculated from the specific surface area by multiplication thereof by the factor K_min; analogously, the maximum amount of solid corresponds from the specific surface area by multiplication thereof by the factor K_max, where $K\_min=0.0009$ [$g/mm^2$]

$K\_max=0.0014$ [$g/mm^2$]

offset=−0.14.

For the optimal amount of solid:

$M(\text{solid})=K\_opt \times F(\text{specific surface area})+\text{offset}$ where $K\_opt=0.0012$ [$g/mm^2$]
offset=−0.14.

With the above factors, it is thus possible, proceeding from the specific surface area of the granular green material, to determine how much solid should be used in order to establish the temperature dependence in a preferred process which has the aim both of polishing of the granules and of producing the consolidated plugs.

Overall, the setting range is somewhat larger than defined by the values of K_min and K_max, which are averaged straight lines. The range is within the limits of E_min and E_max, where $M(\text{solid})=E\_min \times F(\text{specific surface area})$ $M(\text{solid})=E\_max \times F(\text{specific surface area})$ where $E\_min=0.007$ [$g/mm^2$] and $E\_max=0.0017$ [$g/mm^2$].

In the case of application of the required amount of solid against the specific surface area, the setting range corresponds to a cone region which broadens with increasing specific surface area and additionally moves to higher values for the amount of solid required. The setting range is characteristic of a granule having a particular specific surface area.

When the polishing of the surface is effected in a separate process step upstream or downstream of the plug formation, the amount of solid required no longer depends on the specific surface area. This is apparent from FIG. 3. The maximum amount of solid for treatment of the surface is:

$M\_max=0.14\%$ by weight.

Accordingly, the minimum amount of solid for treatment of the surface is:

$M\_min=0.048\%$ by weight.

The maximum amount is defined by an upper limit from which there is no longer any change in the temperature gradient in spite of further addition. The minimum amount of solid brings about a decrease in the temperature gradient by 2%.

Unless stated otherwise in the specific case, the % by weight are based on the amount of the granular green material.

Generally, the polishing of the surface in this context can be equated to graphitization or saturation of the surface with a mixture of graphite and a further solid.

FIG. 4 once again shows the relationship between the specific surface area of the PCP granules and the required amount of solid for formation of plugs (including the surface coating with graphite). For this purpose, amounts of solid are plotted against the points of intersection of the upper temperature gradients from FIG. 1 with the 100% curve for the individual granule sizes, represented by the specific surface area thereof. The dotted curve illustrates how the amount of solid (at the point of intersection with the 100% curve) depends on the specific surface area when drum internals (baffles) optimized for a minimization of the amount of graphite are used. As the graph illustrates, reductions in the amount of graphite in the range of up to 20% can be achieved.

For the optimized process, for example, the following reduced amounts of solid are found:

$M(\text{solid})=K\_min \times F(\text{specific surface area})$ $M(\text{solid})=K\_max \times F(\text{specific surface area})$ where $K\_min=3/4000$ [$g/mm^2$]
and $K\_max=6/5000$ [$g/mm^2$].
The optimal amount of solid is, for example:

$M(\text{solid})=K\_opt \times F(\text{specific surface area})$ where $K\_opt=1/1000$ [$g/mm^2$].

If various granular green material samples are treated in a drum of particular design (and with particular baffles), the proportion by weight of the necessary solid rises in a linear manner (solid line). If another drum with (other) optimized baffles is used, the necessary amount of solid for a particular granular green material sample may be reduced proportionally (broken line). The linear dependence of the amount of graphite on the specific surface area is maintained. Differently optimized baffles or inlets can thus influence the amount of solid required. In contrast, the influence of the volume used and of the fill level used in the drum, or else of the surface roughness of the granular green material, on the amount of graphite is relatively low.

However, the influence of the peripheral speed of the drum on the effect of the treatment of the granular green material with the solid should also be noted.

A further parameter is the peripheral speed of the drum. Thus, according to the radius or diameter of the drum, the rotational speed has to be adjusted in order to obtain a constant peripheral speed. In the case of larger drums, the rotational speed, which in practice is the set parameter, has to be reduced in order to establish the same peripheral speed. Two experiments with PCP2 were conducted in a 220 kg drum. Under otherwise identical parameters, the peripheral speed in the first experiment was 380 m/min. In the second experiment, it was increased by 10%.

220 kg of PCP2 having a total of 0.1% by weight of polytetrahydrofuran, 0.1% by weight of talc, 0.095% by weight of graphite and 15 ml/kg of ethanolic solution (75% ethanol in water) were treated with polytetrahydrofuran at 30° C.

Experiments in the 120 mm weapon give, for the treated powder according to experiment 1, a pressure rise of 180 bar or a ratio of $p\_max$ 63° C. to $p\_max$ 21° C. of 103.2%. For the powder from experiment 2, which was treated at higher peripheral speeds, a pressure rise of bar or a ratio of $p\_max(63°\ C.)$ to $p\_max(21°\ C.)$ of 100.3% is found. The same effect can also be achieved by increasing the amount of solid by 0.02% with unchanged peripheral speed. A further increase in the peripheral speed probably leads to a further enhancement of the effect.

In principle, with an equal peripheral speed, approximately identical results were established when all parameters for the treatment of the granular green material are otherwise kept constant.

Ideally, the ratio of particle length to granule diameter is 1:1 or differs by not more than 20% therefrom. If the granule length is greater than the diameter, a somewhat higher amount of solid will generally have to be used in order to achieve a comparable effect to that in the case of a granule having the same specific surface area but a ratio of granule length to diameter of 1:1.

Experiments have shown that a ratio of granule length to diameter less than 1 can adversely affect the burnoff characteristics. Therefore, the length-to-diameter ratio selected is preferably 1:1 or greater.

A critical specific surface area above which an inventive treatment is unsuccessful has been found. This is because, if the granules or channels in the granules are too small, no plugs can be formed in the hole channels. In the case of granules having a specific surface area of about 1150 mm$^2$/g, it has been demonstrated that no plugs form.

Even in the case of specific surface areas of 600 mm$^2$/g, substantial deviations from the optimal section length may result in no plugs being formed. For example, a change in the ratio of length to diameter from 1:1 to 1:2 at specific surface areas above 600 mm$^2$/g can result in the plugs no longer being formed with the desired reliability.

Figure 5:
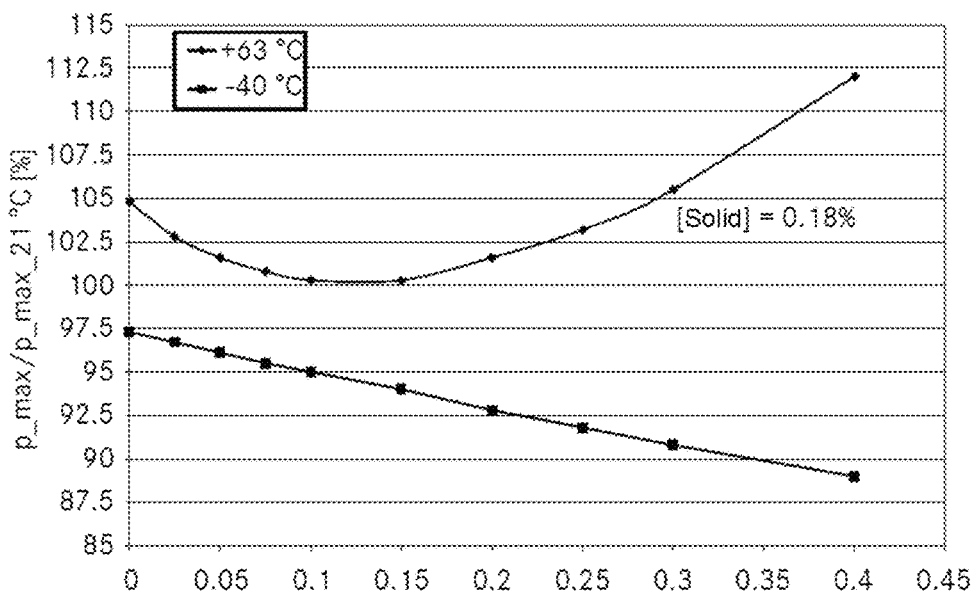
FIG. 5 a diagram of part of the temperature gradient curve as a function of the amount of moderator used for a constant amount of solid for a propellant charge powder of the PCP2 type with a specific formulation from FIG. 1.

FIG. 5 shows the influence of the moderator on the temperature dependence for a constant amount of solid. The solids content is selected within the setting range. Remarkably, there is no crossing point here between the temperature gradient curves for the upper and lower temperature ranges. In the lower temperature range, the temperature gradient curve drops in an essentially linear manner from 97.5% (at 0% by weight of moderator) to 89% (at 0.4% by weight of moderator). In contrast, the upper temperature gradient curve has a minimum of 100% within the range from 0.1 to 0.15% by weight of moderator. In the case of reduction in the amount of moderator to 0% by weight, the temperature gradient is increased to 105%, and in the case of increase in the moderator to 0.4% by weight, the temperature gradient rises to 112%.

In an advantageous aspect of the invention, the amount of moderator is selected to be as small as possible. This can be achieved, for example, when the moderator is used in an amount of less than 0.1% by weight. The amount of 0.1% by weight is particularly preferred because it is at the lower end of the minimal range (0.1-0.15% by weight), and because the temperature gradient here is at 100%.

Figure 6:
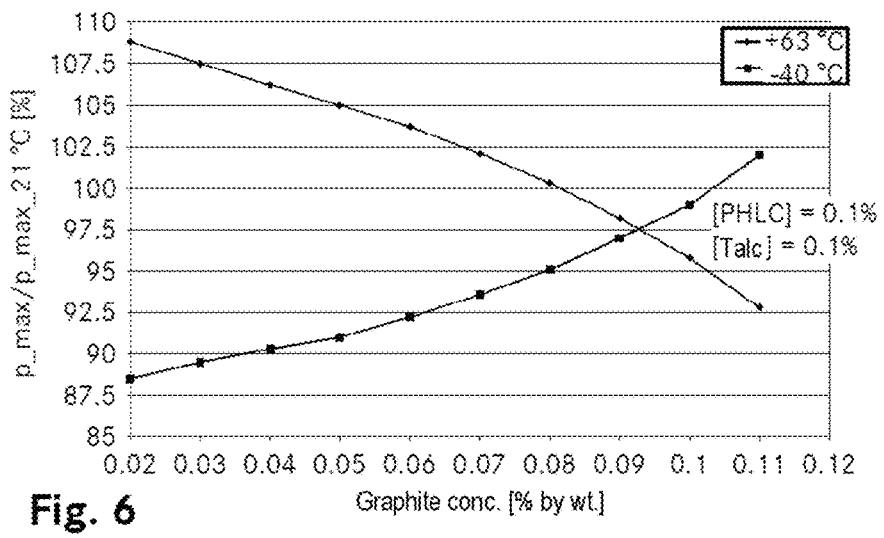
FIG. 6 a diagram of part of the temperature gradient curve as a function of the amount of solid used for a constant amount of moderator for a propellant charge powder of the PCP2 type with a specific formulation from FIG. 1.

FIG. 6 shows a section from the temperature gradient curves for PCP2. As the solid, 0.1% by weight of talc was combined with different amounts (0.02-0.11% by weight) of graphite. The moderator was constant at 0.1% by weight (which is at the lower end of the minimal range according to FIG. 5). The point of intersection of the upper and lower temperature gradient curves is at around 0.2% by weight of solid in total (cf. FIG. 1). The measurements apparent from FIG. 6 should be understood with a statistical variation of 2% (with regard to the temperature gradient). The data points of the temperature gradient curves can be utilized as an empirical dimensioning rule and can be used as specific quantitative statements. The curve found is specific to the propellant charge powder formulation, in this case a triple-base powder comprising NC/DEGN/NGL. An altered formulation may give a different profile.

Figure 7:
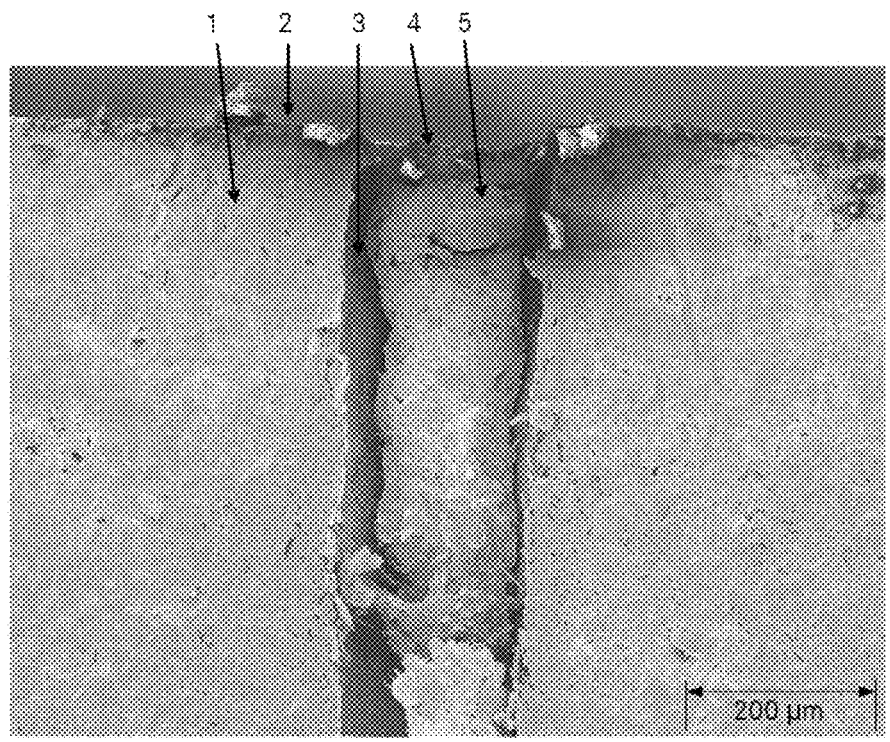
FIG. 7 a photograph of a consolidated plug in a channel of a granular green material.

FIG. 7 shows a photograph of a propellant charge granule which has been cut open. The body 1 has, for example, a circular cylindrical outline with a diameter of, for example, 5.5 mm and a length of, for example, 5-7 mm. On the surface 2 is a graphite layer which ensures adequate electrical conductivity and a smooth surface. The body 1 has a channel 3 which extends in the axial direction of the body 1 and has a diameter of, for example, 0.17 mm. In FIG. 5, only one of several equivalent channels is visible. The opening of the channel 3 is closed with a cover 4 composed of consolidated solid which may have been bonded with moderator. The cover 4 is leakproof and prevents flame entry. In the channel 3 there is a plug 5. This is connected to the cover 4 in a fixed manner and forms a dimensionally stable part composed of consolidated (originally granular) solid.

The cover 4 with the plug 5 molded on has a temperature-dependent mobility. This means that it withstands the ignition pressure within a particular range of the application temperature. In order that the burnoff leads to a relatively flat gas pressure profile at high temperatures, the cover 4 together with the plug 5 molded on withstands the ignition pressure, for example from an application temperature of 35° C., such that the number of burning channels is smaller above this application temperature than below. Since the temperature-dependent mobility is a statistical parameter (i.e. not all plugs in a granule have exactly the same mobility), the multihole powder at high application temperature can burn with fewer holes on average than at low temperature.

This effect is known per se from U.S. Pat. No. 7,051,658 (Nitrochemie Wimmis, Nitrochemie Aschau). What is novel in the present context is that the temperature dependence is in principle established only through the suitable selection of the amount of solid, and that this effect can be optimized to a greater degree.

Figure 8:
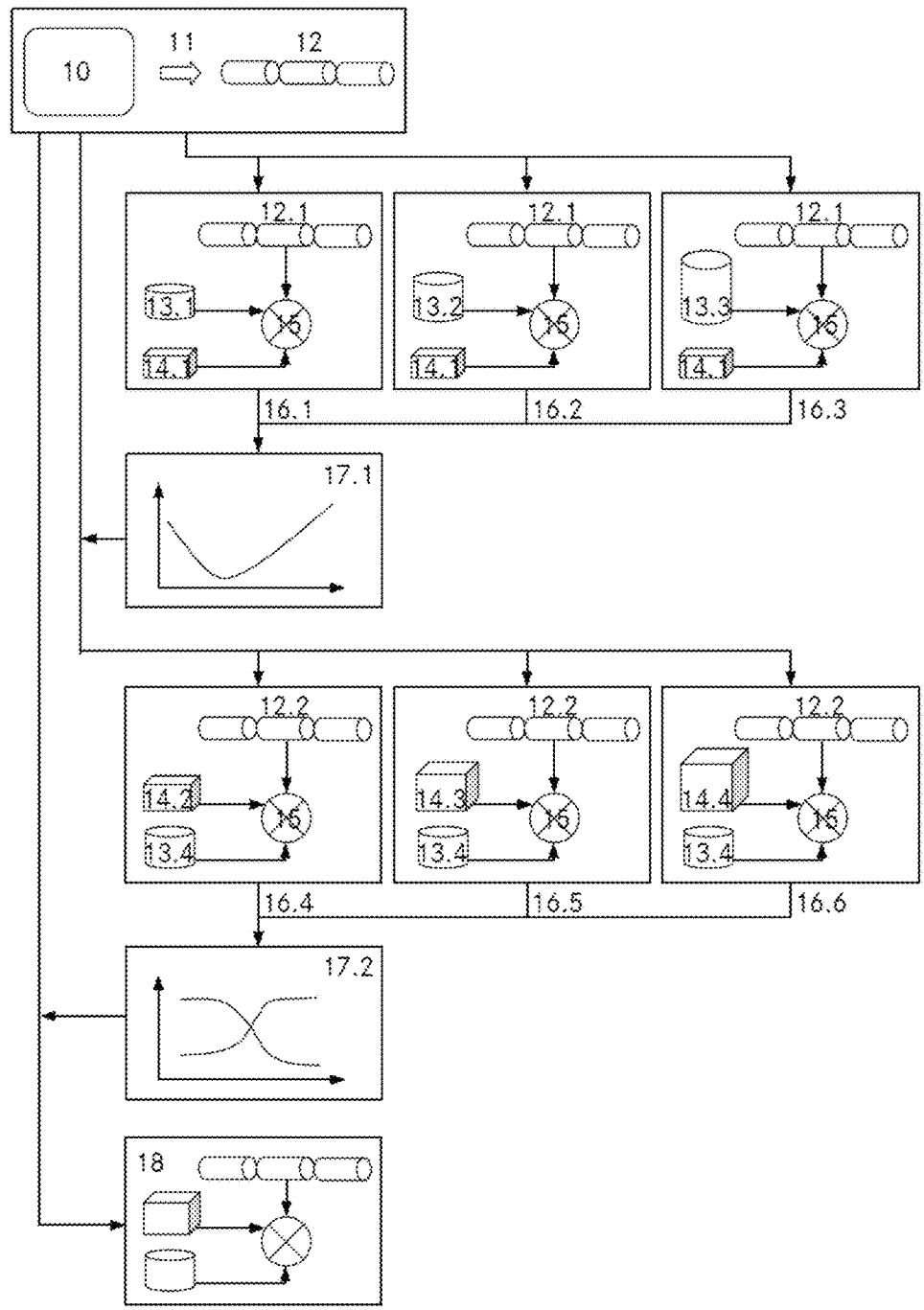
FIG. 8 a schematic diagram of the process for determining the optimal amount of moderator and solid.

FIG. 8 now illustrates the particularly preferred process for optimization of the temperature-dependent characteristics of the propellant charge powder.

Generally, the procedure is as follows:
1. The geometry of the propellant charge granule (shape, number of channels, dimensions) is determined by the intended use.
2. On the basis of this given configuration and the specific surface area thus defined, the minimum amount of solid is selected. In the case of a combined treatment (graphitization plug formation), this is above the amount conventionally required for polishing the specific granular green material present.
3. Then test treatments are conducted with various amounts of moderator (quite low, moderate, relatively high) in order to determine the flat region of the temperature gradient curve.
4. The amount of solvent is adjusted such that the granular green material can take up the amount of solvent during the treatment.
5. Then the amount of graphite is determined. The test treatments must be designed such that the dependence of the temperature gradient on the amount of solid can be found in the tests. Should no temperature effect be apparent, the amount of solid is too small. In the inverse region, the amount of solid is too high.

In a manner known per se, a powder paste 10 is prepared, for example by kneading 58% by weight of nitrocellulose, 26% by weight of nitroglycerine and 16% by weight of diethylene glycol dinitrate. The stabilizer used may, for example, be acardite II. The amount of powder paste is, for example, 8000 kg. This "batch size" selected may also be different according to the application and serves hereinafter merely as an illustrative numerical example for the quantitative ratios.

The granular green material 12 is produced from the powder paste 10 by extrusion 11. The extrusion die produces, for example, 19 holes having an internal diameter in the range of 0.15-0.20 mm. The holes need not all be equal in size; for example, it may be advantageous to provide two different hole diameters. For the sake of simplicity, however, in the present example, holes of essentially equal size are used as the starting point.

Figure 3:
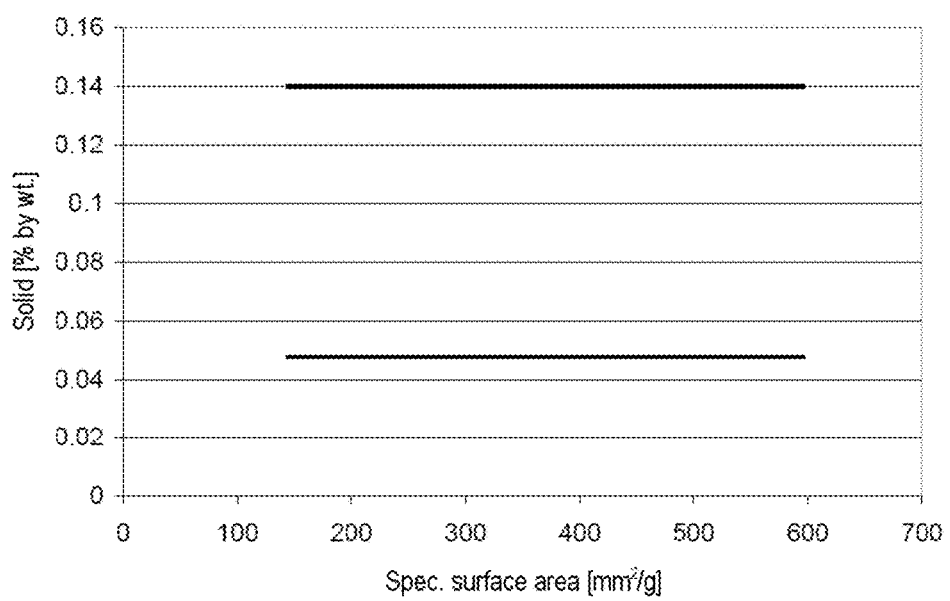
FIG. 3 a diagram of the lower and upper limits for solid in a treatment of the propellant charge powder effected separately from the polishing of the surface.

Three equal portions 12.1 of, for example, 10 kg are taken from the batch of the granular green material 12 thus produced. In the first test treatment 16.1, the first portion 12.1 is processed in the manner of the invention with a first test amount of moderator 13.1 and a test amount of solid 14.1 in a mixing apparatus (for example a rotating treatment drum), so as to form consolidated plugs (as shown in FIG. 6). In the second test treatment 16.2, the second portion 12.1, the second test amount of moderator 13.2 and the test amount of solid 14.1 are processed in the same mixing apparatus 15 with otherwise the same process conditions as the first test amount 12.1. Analogously, in the third test treatment 16.3, the portion 12.1, the test amount of moderator 13.3 and the test amount of solid 14.1 are processed. In these three test treatments 16.1-16.3, only the test amounts of moderator 13.1-13.3 differ. They are fixed, for example, at 0.05, 0.15 and 0.25% by weight. The test amounts of solid 14.1 are of equal size and are, for example, in the middle of the setting range for the specific surface area of the granular green material (FIG. 2 and FIG. 3).

The propellant charge powders obtained from the three test treatments 16.1, 16.2, 16.3 are examined in the pressure bomb with regard to the temperature dependence thereof, and the minimal range of the temperature dependence based on the amount of moderator, as illustrated by FIG. 4, is determined. On the basis of this examination 17.1, the user can choose an appropriate value for the amount of moderator. This amount of moderator is preferably selected at the lower end of the minimal range. The selected amount of moderator 13.4 (e.g. 0.08% by weight in the case of a propellant charge powder according to FIG. 4) is retained for the next test stage (and the production stage which follows later).

In the next stage, three further, equal portions 12.2, again each of 10 kg, are branched off from the batch of the granular green material 12. The first portion 12.2 is processed in the manner of the invention with the test amount of moderator 13.4 selected on the basis of the first test treatment stage (generally not corresponding to one of the test amounts of moderator 13.1-13.3) and a first test amount of solid 14.2 in a mixing apparatus 15 (test treatment 16.4), so as to form consolidated plugs. In the same mixing apparatus 15, the second portion 12.2, the test amount of moderator 13.4 and the test amount of solid 14.3 are processed with otherwise the same process conditions as the first test amount 12.2 (test treatment 16.5). Analogously, for the third portion 12.2, the test amount of moderator 13.4 is processed with the test amount of solid 14.4 (test treatment 16.6). In these three test treatments 16.4-16.6, only the test amounts of solid 14.2-14.4 differ. They are fixed, for example, at 0.5, 0.6 and 0.7% by weight in the case of a granular green material of the PCP1 type in FIG. 1. The test amounts of moderator 13.4 are equal in size. Generally, the test amount of solid can be fixed at the minimum, optimum and maximum value for solid according to FIG. 2 or FIG. 3. Preferably, the three test amounts of solid are different by less than half of the setting range, in order that the profile of the temperature gradient curves can be determined reliably, and to avoid presence in the flat region of the S or Z characteristics on both sides.

The propellant charge powders obtained from the three test treatments 16.4, 16.5, 16.6 are examined for their temperature dependence in the pressure bomb, and the crossing range of the temperature dependence based on the amount of solid, as illustrated by FIG. 1, is determined. On the basis of this examination 17.2, the user can select an appropriate value for the amount of solid. This amount of solid is preferably selected roughly at the crossing point of the temperature gradient curves. In the case of a propellant charge powder according to FIG. 5, the optimal amount of solid would be roughly 0.09% by weight of graphite plus 0.1% by weight of talc. In the example of FIG. 5, the amount of solid could quite possibly also be approx. 0.08% by weight of graphite and 0.1% by weight of talc (i.e. a total of 0.18% by weight of solid), because this is still sufficiently close to the crossing point (i.e. less than 10% deviation of solid) and at the same time has a temperature gradient in the upper temperature range (21-63° C.) close to 100%.

The amounts of moderator and solid selected are used in the production 18, which typically work with batches of 200 kg or more. In practice, it is checked at certain intervals (i.e. for certain production batches) whether the propellant charge powder still has the desired properties. If the temperature dependence changes, it is possible to undertake a correction with controlled adjustments of the amount of solid. The moderator content need not and should not be altered. Whether the amount of solid is to be increased or lowered if anything can be determined on the basis of the result of the examination 17.2. Because the solid is inert toward the propellant charge powder, it is assured that the change in the production parameters (amount of solid) does not show any unwanted side effects. It is possible to influence only the temperature dependence in a controlled manner.

The compatibility of the substances used (solid, moderator) with the granular green material can be determined by suitable measurement methods from case to case. For example, intensive mixing operations of the granular green material and surface treatment materials are examined for extensive evolution of heat at 80° C. in a heat flux calorimeter (HFC), or the surface treatment material is applied to the granular green material in excess amounts or diffused into the granular green material. These samples are subjected to the 90° C. weight loss test or analyzed in an HFC. A further test for determination of the compatibility is the determination of the deflagration temperature of such surface treatment materials/granular green material mixtures.

The liquid and the solid, and also the solid/liquid ratio, should be selected such that the solid particles do not agglomerate but retain their full mobility. This is important for the formation of the plugs in the mouths of the channels.

In principle, it is possible to use any solid or any solid mixture which is chemically stable within the application temperature range of the propellant charge powder and is compatible with the propellant charge powder formulation, and hence does not adversely affect the chemical lifetime. Moreover, the solid must not melt over the entire production, firing and storage temperature range, and not sublime away from and/or diffuse into the propellant charge powder granule in significant proportions over the entire lifetime. Preference is given to selecting substances whose melting point is at least 10° C., especially 20° C., above the maximum use temperature. Preference is given to substances which have a melting point above 90° C. and are insoluble in the propellant charge powder formulation or have only very low solubility at most therein.

Preference is additionally given to solids or solid mixtures which exert a positive influence on the propellant charge powder (LOVA properties=low-vulnerability ammunition, high bulk density, good free flow, erosion-reducing, fire-suppressing, high energy content, electrical conductivity and good ignitability).

The solids or mixtures thereof are, in particular, inert substances.

For reasons of ignitability of the propellant charge powder, it is necessary to use minimum amounts of the inert solids or mixtures thereof.

The moderators used are solid or liquid substances. The solid moderators must dissolve in the low-viscosity liquid which is used as the third component. Liquid moderators or moderator solutions may also be in emulsified form in the low-viscosity liquid.

Suitable moderators are in principle all solid and liquid substances having good chemical compatibility with the base formulation of the granular green material and low volatility (e.g. vapor pressure at 21° C. of $<10^{-2}$ bar). The moderator can be used as a pure substance or as a substance mixture.

The moderators used are generally inert substances. However, it is entirely possible that energetic "moderators" can be used: however, these must be insensitive to mechanical stress during the surface treatment operation, in later munition assembly or in the course of munition transport and use.

The moderator may either be soluble or insoluble in the propellant charge powder matrix. If the moderator is soluble, it is also referred to as a phlegmatizer and can also be used in accordance with this function known per se.

In the case of use of a moderator soluble in the propellant charge powder matrix, a concentration gradient forms in the outermost propellant charge powder layer in the course of surface treatment. This concentration gradient can break down as a result of diffusion during the propellant charge powder lifetime, which inevitably alters the burnoff properties of the propellant charge powder. This is usually manifested in higher vivacities and peak gas pressures, which has an unfavorable effect on the ballistic properties and in the extreme case can destroy the weapon.

This ballistic instability (caused by diffusion processes) in the propellant charge powder must not occur. Therefore, the problem of moderator diffusion is of central significance in the surface treatment of propellant charge powders. The diffusion phenomena are dependent on the composition of the propellant charge powder, on the nature of the moderator used and on the temperature.

If double-base or multibase propellant charge powders having high blast oil concentrations are used, the diffusion of moderators is promoted to a relatively high degree. Therefore, the inventive surface treatment must be designed such that only a slight diffusion-related change in the internal ballistic properties, if any, occurs during the propellant charge powder storage. If readily diffusing moderators are used, it is necessary either to use sufficiently small amounts or to ensure that the diffusion process is essentially complete before the munition is assembled.

Examples of low-viscosity liquids of particularly good suitability are water, mixtures of water and methanol, mixtures of water and ethanol, mixtures of water and propanol, mixtures of water and acetone, mixtures of water and tetrahydrofuran, and also pentane, hexane, heptane, cyclohexane, toluene, methylene chloride and mixtures thereof.

The abovementioned substances are used to treat perforated propellant charge powders in a polishing drum. For this purpose, the volume of a steel or copper polishing drum of any desired size, the minimal volume being limited to about 10 liters, is filled partly with a perforated propellant charge powder. The fill level desired is between 5 and 50%, preferably between 10 and 40%. The propellant charge powder may be ungraphitized or graphitized. For this purpose, the solid or the solid mixture is first applied with rotation and distributed homogeneously over the entire propellant charge powder surface. If the propellant charge powder used has already been adequately graphitized, it may be possible to dispense with further introduction of solid, or another solid can additionally be added thereto. Then a solution composed of the low-viscosity liquid and the moderator or the moderator mixture is added. In the case of a desired crosslinking of polymerizable moderators, this solution additionally contains the polymerization initiator.

Since, for safety reasons (electrostatic charging in the course of transport of propellant charge powder), the powder always has to be covered with an electrically conductive material, at least one of the solid components in the combined treatment should either be graphite dust or acetylene black.

In the inventive treatment, under very substantially optimal flow conditions for the propellant charge powder granules and at temperatures between 0° C. and 90° C., preferably between 20° C. and 70° C., the added substances are allowed to come into contact with the propellant charge powder surface over a particular period. This contact process lasts for between 5 minutes and 4 hours, preferably between 15 minutes and 120 minutes. The polishing drum has to remain closed in a gas-tight manner over the contact time (according to the vapor pressure of the liquid used).

After the contact time, in the case of a gas-tight treatment device, the lid of the filling hole is normally removed, such that the low-viscosity liquid can for the most part vaporize. This vaporization process too has to be controlled accurately in terms of time. The duration may be between 5 minutes and 4 hours; preference is given to vaporization for between minutes and 120 minutes. The vaporization can additionally be supported or promoted by further measures. For example, an air or inert gas stream can be passed over the moist propellant charge powder. However, washing with a liquid must be avoided, since the plugs are otherwise washed out.

In the case of non-polymerizing moderators, the treated propellant charge powder is subsequently subjected to a drying process. This removes the last traces of solvents and stabilizes the treatment layer. For instance, the propellant charge powder is typically left at 60° C. in an air circulation oven for about 3 days. It is thus possible to remove ethanol, for example, completely (<0.01%). The drying of the finished powder takes longer than in the processes which do not have to produce consolidated plugs from solid.

If a free-radically polymerizable moderator is used, and a polymerization reaction is to be conducted, an appropriate polymerization initiator is additionally added. The treatment of the propellant charge powder is conducted at minimum temperature, and the low-viscosity liquid is removed at the same temperature. Preferably, the treatment is conducted at room temperature.

Subsequently, the propellant charge powder freed of solvent residues and of the atmospheric oxygen under reduced pressure and placed under inert gas. Alternatively, the propellant charge powder can also merely be purged with the inert gas in order to displace the atmospheric oxygen. The inert gas used may, for example, be nitrogen or argon. Only then is the propellant charge powder mass heated under inert gas to the required polymerization temperature, which is normally 30° C. to 60° C. above the treatment temperature.

If treatment is effected, for example, at room temperature, a polymerization initiator which is thermally stable at room temperature but which decomposes very rapidly to the corresponding free radicals at 50° C. to 80° C. is used.

The breakdown half-life of a polymerization initiator is the time within which half of the initiator has broken down to free radicals at a particular temperature. Because of its central significance, this breakdown half-life is known for all commercially available thermal initiators. To make sure that the polymerization reactions proceed substantially to completion, the polymerization time at a particular temperature is set to four to six times the breakdown half-life of the initiator used at this temperature. Then the propellant charge powder is cooled to room temperature directly under air or under the inert gas. Since preferably low-boiling, apolar solvents are used for the application of the polymerizable moderator, the propellant charge powder is virtually solvent-free after the evacuation and polymerization.

The effect of the processes detailed above is that the hole channels are closed in the inlet region by compact, consolidated plugs consisting principally of the solids or solid mixtures used (FIG. 6).

In this context, the effect of the low-viscosity liquid and/or the moderator soluble in the propellant charge powder (phlegmatizer) is that the plug is additionally consolidated and anchored in the hole channel.

It has been observed that, when they are ignited at high powder temperatures, the plugs are anchored in a virtually stable manner in the hole channels and remain in place. Thus, in the first burnoff phase, the ignition operation of the propellant charge powder, as a result of the altered form function, is different than in the conventional behavior, and the inherently rapid powder burnoff at high temperatures is therefore compensated for to a high degree. If the same propellant charge powder is ignited at room temperature, the form function changes in that a more rapid increase in surface area takes place, and hence the gas formation rate can be brought in line with that at high use temperatures. Finally, at very low propellant charge powder temperatures, it was observed that the gas formation rate approaches that of a granular green material because of the attainment of conventional behavior with regard to form function in the case of perforated propellant charge powders.

The burnoff in the perforations of the propellant charge powder is thus slowed as a result of the treatment-related influence on the form function at rising powder temperatures. This is counteracted by the increasing combustion rate of the propellant charge powder with rising temperature. Ideally, the two effects compensate one another, such that the surface-treated propellant charge powder has temperature-independent burnoff characteristics.

Given the correct selection of the surface treatment components, this effect is maintained even when the treated propellant charge powder is subjected to accelerated aging (e.g. storage at 63° C. for 4 weeks) or is stored for a very long period at room temperature. Thus, the surface-treated propellant charge powder has good ballistic stability, meaning that the munition filled with this propellant charge powder can be fired reliably and with consistent power.

FIG. 9a,b shows, in schematic form, the distribution of the moderator in the granular green material matrix before (a) and after (b) the heat treatment. The abscissa corresponds to a cross section through a green material granule at right angles to the channels. Plotted on the ordinate is the concentration of the moderator.

During the surface treatment, the moderator diffuses to a slight extent into the matrix of the granular green material 1. The concentration thereof is then at its greatest close to the surface 2 and from the channels 3 outward (FIG. 9a).

The heat treatment achieves homogeneous distribution of the moderator in the granular green material matrix 1 (FIG. 9b). As a result, there is no moderator gradient, and so it cannot diffuse any further. Thus, any ballistic change in the propellant charge powder with time is avoided. Alternatively, migration of the moderator during storage can be prevented by fixing the moderator, for example by polymerization.

FIG. 10a,b shows, in schematic form, the advantageous effect of the granular green material treatment when fired in a weapon. FIG. 10a shows the peak pressure as a function of temperature. The temperature values may be assumed to be, for example, $T_{min}$=−40° C., $T_{norm}$=+21° C. and $T_{max}$=+63° C. However, other values are also possible. FIG. 10b shows the dependence of the muzzle velocity on the temperature. An untreated granule (granular green material) shows linear behavior, meaning that the pressure thereof or its muzzle velocity rises with increasing temperature.

In contrast, the treated propellant charge powders show a much flatter profile. More particularly, the pressure values or else, analogously, the values of the muzzle velocity at high temperatures are below those for the normal temperatures.

A munition can firstly be optimized with respect to its power. The corresponding propellant charge powder exhibits flatter thermal characteristics compared to the untreated granular green material. However, the maximum pressure in the lower temperature range T_min is raised significantly. This results in an increased muzzle velocity and hence a rise in power.

However, a munition can also be improved with regard to minimum barrel erosion. It has lower pressures overall compared to a power-optimized propellant charge powder. The crucial factor is that the maximum pressure in the upper temperature range T_max has been greatly lowered, which improves protection from barrel erosion.

From FIG. 11, it is possible to derive a real mixture of propellant charge powders treated with different intensity. By mixing granular material which has not been treated in an ideal manner, or by mixing untreated granular material (granular green material) with granular material which has been treated with excessive intensity and has inverse thermal characteristics (meaning that the gas pressure at −40° C. is higher than at 63° C.), it is possible to produce propellant charge powders which exhibit a very flat, virtually optimal temperature profile.

FIG. 11 shows the temperature gradient curve for PCP2 as a function of the amount of solid used. Two points (a and b) are marked. In the case of PCP2a (upper point), the effect of the treatment is very weak and the maximum gas pressure at 63° C. has been lowered only by 2.1%. The ratio of the maximum gas pressure at 63° C. relative to that at 21° C. (Δa) is still 108.8% (originally 110.9%). In contrast, the effect of the treatment for PCP2b (lower point) is very significant. The ratio of the maximum gas pressure at 63° C. to that at 21° C. (Δb) is only 89.0%.

$$\text{amount}(PCPa)/\text{amount}(PCPb) = \Delta b / \Delta a$$

The two differently treated propellant charge powders can then be mixed to give a propellant charge powder having an optimal temperature gradient. In the present case, a mixture of PCP2a and PCP2b in a ratio of about 54:46 gives optimal behavior. In particular cases, it may be advantageous to take account of non-linear effects.

Alternatively, it is also possible to mix granular green material GGM with PCP2b, in order to obtain a propellant charge powder with optimal temperature gradient.

With regard to the examples described below, the following should be stated:

The propellant charge powder raw material was produced from 58% nitrocellulose, 26% nitroglycerine and 16% diethylene glycol dinitrate. The stabilizer used was acardite II.

The perforated granular green material was produced in an extruded press having a 19-hole die. The die dimension is specified in each of the examples.

The surface-treated granular green material having virtually temperature-independent burnoff characteristics is also referred to as SCDB (Surface Coated Double Base) propellant charge granules.

Example 1

The starting material used is a granular green material having an external diameter of 12.3 mm and having 19 continuous channels having an internal diameter of 0.18 mm. In a rotary drum, 220 kg of granular green material are treated with 187 g of graphite (0.085% by weight) and 220 g of talc (0.16% by weight) over the course of 10 min. This solid is distributed homogeneously over the surface of the granular green material. Thereafter, 2780 g of ethanol (75% by volume, 15 ml per kg of granular green material) and 220 g of polytetrahydrofuran (0.16% by weight) are added as liquid and a treatment is conducted with the drum closed in a gas-tight manner over the course of 1 h. In the next step, the drum is opened and the solvent is vaporized with the drum running over the course of 30 min. The treatment temperature is 30° C. Thereafter, the treated granular green material is dried at 55° C. over the course of 70 h.

Example 2

In a further example, 55 kg of a granular green material of the same geometry as in ex. 1 (external diameter 12.3 mm, 19-hole powder, internal diameter of the channels 0.18 mm) are preheated to 30° C. and mixed with 90.75 g of graphite (0.165% by weight). As soon as the solid has been distributed homogeneously over the surface, 2780 g of ethanol (75% by volume, 15 ml per kg of granular green material) and 165 g of polytetrahydrofuran (0.3% by weight) are added. Stirring with the drum closed at 30° C. over the course of 60 min is followed by vaporization with the drum open and running over the course of 30 min. The treated granular green material is dried at 60° C. over the course of 140 h.

Example 3

220 kg of a 19-hole granular green material having a diameter of 12 mm and an internal diameter of the channels of 0.20 mm are treated at 30° C. with 0.40% by weight of graphite over the course of 10 min. Then ethanol (75% by volume, 10.6 ml per kg of granular green material) and 0.08% by weight of polytetrahydrofuran are added. The mixture is stirred with with the drum closed at 30° C. over the course of 60 min, then the solvent is vaporized with the drum open and running over the course of 30 min. The treated granular green material is dried at 60° C. over the course of 72 h.

In summary, it can be stated that the invention provides a process for adjusting the temperature dependence, based on controlled variation of the amount of solid. The process influences the form function of the burnoff characteristics in that plugs of consolidated inert material are formed in the channels of the propellant charge powder, which have a temperature-dependent mobility controlled by the amount of solid.

The invention claimed is:

1. A process for producing a propellant charge powder having reduced temperature dependence within a given application temperature range, having the following steps:
   a) providing a swellable granular green material having a given geometric configuration with at least one continuous channel having a characteristic transverse dimension of not more than 0.3 mm and opening at an outer surface of the granular green material,
   b1) providing a solid which is stable within the application temperature range and is inert toward the granular green material and which has a particle size which can be introduced into the continuous channels, and which can be compacted in the course of a mixing and drying process,
   b2) selecting an amount of solid within a range of between 95% and 105% of an intersection of the temperature gradient curves which define the lower and upper temperature coefficients,
   c) providing a liquid which can swell the granular green material and can either be completely removed or is present in homogeneous distribution in the propellant charge powder at the end of the production of the propellant charge powder,
   d) where the liquid contains not more than 0.5% by weight—based on the weight of the granular green material—of an oligomeric or polymeric substance which serves as a moderator, and where another portion of the liquid is a low-viscosity solvent, e) treating the granular green material with the liquid and the solid in a mixing apparatus over a given duration, and f) drying the treated granular green material over a given duration, wherein g) the temperature dependence of the propellant charge powder is established by adjusting the amount of solid within a setting range from >0 to 0.5% by weight for formation of plugs, by, under otherwise identical process conditions, using a greater amount of solid for more significant lowering of the maximum pressure within an upper temperature range and for more significant raising of the maximum pressure within a lower temperature range of the application temperature range.

2. The process as claimed in claim 1, characterized in that the granular green material, in the course of a graphitization which serves to increase a conductivity and to avoid any conglutination of the granular green material, prior to the treatment thereof in the mixing apparatus, is coated with graphite in an amount M(solid) matched to the specific surface area of the granular green material, and in that the amount of solid for formation of the plugs is selected within the range of $$0 < M(\text{solid}) \leq M\_\text{max}$$

where

M(solid) is the amount of solid in % by weight based on the weight of the granular green material M_max=0.14% by weight.

3. The process as claimed in claim 1, characterized in that the solid comprises graphite, and in that the amount of solid is a sum of the amount of graphite required in the course of a graphitization which serves to increase a conductivity and to avoid any conglutination of the granular green material plus the amount of solid selected within the setting range, such that the amount of solid is selected within the range of $$K\_\text{min} \times F(\text{specific surface area}) + \text{offset} \leq M(\text{solid})$$
$$\leq K\_\text{max} \times F(\text{specific surface area}) + \text{offset}$$

where

K_min=0.0009 [g/mm²]

K_max=0.0014 [g/mm²]

offset=−0.14, especially in that the amount of solid is given by

M(solid)=K_opt×F(specific surface area)+offset

K_opt=0.0012 [g/mm²]

offset=−0.14.

4. The process as claimed in claim 1, characterized in that the swellable granular green material has a specific surface area of not more than 600 mm²/g.

5. The process as claimed in claim 1, characterized in that the swellable granular green material has a ratio of length to diameter of at least 1:1.

6. The process as claimed in claim 1, characterized in that the amount of moderator is selected within a range in which a temperature gradient curve which defines the upper temperature coefficient has a minimum.

7. The process as claimed in claim 1, characterized in that the solvent is provided in an amount which can be taken up completely within the given duration of treatment of the granular green material with the liquid and the solid in a mixing apparatus.

8. The process as claimed in claim 1, further comprising: determining the amount of solid by treating at least three batches having different amounts of solid, the amounts of solid differing by not more than 0.2% by weight based on the granular green material.

9. The process as claimed in claim 8, characterized in that the amounts of solid in the batches differ by about 0.1% by weight.

10. The process as claimed in claim 1, further comprising: increasing the amount of solid roughly proportionally from >0 to M(solid); where M(solid)=K_max×F(specific surface area)+offset where M(solid) is the amount of solid in % by weight based on the weight of the granular green material F(specific surface area) is the specific surface area of the granular green material in mm²/g and K_max=0.0014 [g/mm²]

offset=−0.14, in order to lower the relative maximum pressure roughly proportionally within the upper temperature range from 105% to 95%, or in that the amount of solid is increased roughly proportionally from >0 to M(solid)=K_max× F(specific surface area)+offset, in order to increase the relative maximum pressure within the lower temperature range roughly proportionally from 87% to 105%.

11. The process as claimed in claim 1, characterized in that the channels have a characteristic transverse dimension of 0.1-0.2 mm.

12. The process as claimed in claim 1, characterized in that an amount of the moderator within the range between 0 is increased to 0.4% by weight, in order to lower the relative maximum pressure from 97% to 88% within the lower temperature range, or in that the amount of moderator is increased from 0 to 0.15% by weight, in order to lower the relative maximum pressure from 105% to 100% within the upper temperature range.

13. The process as claimed in claim 1, characterized in that the moderator is used in an amount of 0.05-0.2% by weight.

14. The process as claimed in claim 1, characterized in that a) at least one first and one second portion from a batch of extruded granular green material are processed in a particular mixing and drying process with a particular test amount of solid and at least two different test amounts of moderator, and this is used to find a minimal range for a temperature gradient within the upper temperature range and to choose an amount of moderator within the minimal range, b) at least two further portions from said batch of granular green material are processed in the particular mixing and drying process with the selected amount of moderator and at least two different test amounts of solid, and this is used to find a range of intersection of the upper and lower temperature gradients and to choose an amount of solid, and in that c) a production amount of said batch is processed in the particular mixing and drying process with the chosen amount of moderator and the chosen amount of solid.

15. The process as claimed in claim 14, characterized in that the mixing and drying process comprises the following steps:

a) introducing granular green material, solid and a low-viscosity liquid into a mixing apparatus, b) where the solid is a substance whose melting point is at least 10° C., especially 20° C., above a maximum use temperature of the propellant charge powder and which is inert toward the granular green material, c) the moderator is a substance which has good chemical compatibility with the base formulation of the granular green material and has a low volatility, i.e. vapor pressure, at 21° C. of <10−2 bar, d) the low-viscosity liquid is a solvent or solvent mixture which can very efficiently dissolve or finely emulsify the solid or liquid plug-stabilizing moderator, but which is able to swell the granular green material only to a very slight degree, if at all, and is used in an amount of 0.1% by weight to 5% by weight, based on a weight of the granular green material, e) where the solid is incorporated gradually into the channels of the granular green material under the action of a powder material pressure exerted by the mixture with rotation in the mixing apparatus, f) and then removing the liquid by vaporization out of the granular green material with continued processing by the mixing apparatus, g) and drying the granular green material thus treated at elevated temperature, h) in such a way that a compacted and anchored portion of the nonvolatile solid in the channel is produced, which forms a plug consisting principally of the solid used and of the optional moderator and having a temperature-dependent mobility, in that the plug can withstand an ignition pressure wave in a controlled manner, a strength of the plug being established by a treatment period in the mixing apparatus in the sense that a longer treatment period leads to a stronger plug, i) in such a way that a higher mobility exists at lower application temperature than at higher application temperature, such that the plug permits stronger hole burnoff at lower application temperature than at higher application temperature, so as to result in a reduced temperature independence of a propellant charge powder burnoff.

16. The process as claimed in claim 1, characterized in that the solid comprises one or more of the following substances: graphite, talc, titanium oxide, carbon black, potassium sulfate, potassium cryolite, sodium cryolite, calcium carbonate, tungsten trioxide, molybdenum trioxide, magnesium oxide, boron nitride, acardite, centralite, calcium carbonate, oxalamide, ammonium carbamate, ammonium oxalate, cellulose acetate butyrate, potassium perchlorate, potassium nitrate, barium nitrate, sodium oxalate, fullerenes, or polymers and copolymers with or without functional groups, linear, branched or crosslinked.

17. The process as claimed in claim 1, characterized in that the propellant charge powder is dried over at least 60 hours, optionally over 3 days and optionally at 60° C.

18. The process as claimed in claim 1, characterized in that the moderator used is polytetrahydrofuran or a polyether having molecular weights of 500 to 3000 daltons.

19. The process as claimed in claim 1, characterized in that the mixing apparatus remains closed in a gas-tight manner during a contact time, and in that it is subsequently open for vaporization of the liquid over a particular duration within the range from 5 minutes to 4 hours.

* * * * *